(12) United States Patent
Byfield

(10) Patent No.: US 12,007,176 B2
(45) Date of Patent: Jun. 11, 2024

(54) HEAT EXCHANGER AND METHOD OF MANUFACTURING A HEAT EXCHANGER

(71) Applicant: Woodside Energy Technologies Pty Ltd, Perth (AU)

(72) Inventor: Geoffrey Byfield, Nedlands (AU)

(73) Assignee: Woodside Energy Technologies Pty Ltd, Perth (AU)

( * ) Notice: Subject to any disclaimer, the term of this patent is extended or adjusted under 35 U.S.C. 154(b) by 62 days.

(21) Appl. No.: 16/023,478

(22) Filed: Jun. 29, 2018

(65) Prior Publication Data

US 2019/0033013 A1 Jan. 31, 2019

Related U.S. Application Data

(63) Continuation of application No. PCT/AU2017/050275, filed on Mar. 30, 2017.

(30) Foreign Application Priority Data

Mar. 30, 2016 (AU) ................................ 2016901182

(51) Int. Cl.
*F28D 7/00* (2006.01)
*B22F 5/10* (2006.01)
(Continued)

(52) U.S. Cl.
CPC .............. *F28D 7/0008* (2013.01); *B22F 5/10* (2013.01); *B22F 10/20* (2021.01); *B33Y 80/00* (2014.12);
(Continued)

(58) Field of Classification Search
CPC ...... F28D 7/0025; F28D 7/0008; F28F 1/022; F28F 1/025; F28F 13/08; F28F 13/12;
(Continued)

(56) References Cited

U.S. PATENT DOCUMENTS 1,852,490 A 4/1932 Sullivan
1,893,484 A 1/1933 Belt
(Continued)

FOREIGN PATENT DOCUMENTS

JP H01218632 A 8/1989
JP 2001153573 A * 6/2001 ............. F25J 1/0037
(Continued)

OTHER PUBLICATIONS

Australian International-Type Search Report, 2016901182, dated Nov. 2, 2016, 9 pages.
(Continued)

*Primary Examiner* — Jianying C Atkisson
*Assistant Examiner* — For K Ling
(74) *Attorney, Agent, or Firm* — Edell, Shapiro & Finnan, LLC

(57) ABSTRACT

A heat exchanger includes a plurality of sets of fluid channels, each fluid channel including first and second end portions and an intermediate portion between the first and second end portions. The first end portions in a plane perpendicular to a direction of fluid flow in the channels have respective end perimeters which are in a first configuration, where adjacent end portions of different sets of fluid channels have a total first shared heat transfer length, this being a summation of lengths of mutually opposed perimeters of the so adjacent end portions of the different sets. The intermediate portions of the channels in a plane transverse to the direction of fluid flow have respective intermediate channel perimeters, the intermediate portions having a second configuration with a total second shared heat transfer length being a summation of lengths of mutually opposed channel perimeters of the adjacent channels of the different sets. Therefore, the total second shared heat transfer length (Continued)

is different to, and moreover greater than, the total first heat transfer length.

13 Claims, 10 Drawing Sheets

(51) Int. Cl.
    *B22F 10/20*     (2021.01)
    *B33Y 80/00*     (2015.01)
    *F28D 9/00*     (2006.01)
    *F28F 3/08*     (2006.01)
    *F28F 7/02*     (2006.01)

(52) U.S. Cl.
    CPC .......... *F28D 9/0025* (2013.01); *F28D 9/0037* (2013.01); *F28D 9/0062* (2013.01); *F28F 3/086* (2013.01); *F28F 7/02* (2013.01); *F28F 2255/18* (2013.01); *Y02P 10/25* (2015.11)

(58) Field of Classification Search
    CPC ........ F28F 7/02; F28F 9/02; F28F 2009/0285; F28F 9/0275; F28F 9/027
    USPC ........................................................ 165/147
    See application file for complete search history.

(56) References Cited

U.S. PATENT DOCUMENTS

| | | | | |
|---|---|---|---|---|
| 3,926,251 A * | 12/1975 | Pei | ................. | F28F 21/006 165/165 |
| 4,156,625 A * | 5/1979 | Wachendorfer, Sr. | .... | F28F 7/02 156/245 |
| 4,601,332 A * | 7/1986 | Oda | .................. | F28F 7/02 165/165 |
| 4,746,479 A | 5/1988 | Hanaki et al. | | |
| 4,762,171 A * | 8/1988 | Hallstrom | .............. | B01D 1/221 165/147 |
| 5,725,051 A * | 3/1998 | Veltkamp | ................ | F28F 21/06 165/164 |
| 7,111,673 B2 * | 9/2006 | Hugill | ..................... | F25J 5/002 165/166 |
| 7,285,153 B2 * | 10/2007 | Bruun | ..................... | F23C 13/00 95/43 |
| 9,618,278 B2 * | 4/2017 | Denkenberger | .... | B29C 66/1122 |
| 10,112,271 B2 * | 10/2018 | Veilleux, Jr. | .......... | F28D 7/0066 |
| 11,079,186 B2 | 8/2021 | Walter et al. | | |
| 2005/0103482 A1 | 5/2005 | Park et al. | | |
| 2005/0217837 A1 * | 10/2005 | Kudija, Jr. | ............. | F28D 7/0008 165/165 |
| 2008/0011462 A1 * | 1/2008 | Tasaki | ..................... | F28F 13/08 165/147 |
| 2010/0163216 A1 | 7/2010 | Schochlin | | |
| 2010/0270011 A1 * | 10/2010 | Takahashi | ............... | F28F 21/04 165/148 |
| 2013/0206374 A1 * | 8/2013 | Roisin | .................. | F28D 7/0041 165/165 |
| 2013/0236299 A1 | 9/2013 | Kingston et al. | | |
| 2013/0264031 A1 * | 10/2013 | Plourde | .................. | B23P 15/26 165/104.11 |
| 2015/0086439 A1 * | 3/2015 | Hamada | ................. | F28F 13/08 422/198 |
| 2017/0205146 A1 * | 7/2017 | Turney | .................. | F28D 7/0033 |
| 2017/0205149 A1 * | 7/2017 | Herring | ..................... | F28F 1/04 |
| 2018/0266770 A1 * | 9/2018 | Wagner | ..................... | F28F 7/02 |

FOREIGN PATENT DOCUMENTS

| | | |
|---|---|---|
| WO | 2016139019 A1 | 9/2016 |
| WO | 2017052798 A1 | 3/2017 |

OTHER PUBLICATIONS

International Search Report, PCT/AU2017/050275, dated Jun. 20, 2017, 5 pages.

* cited by examiner

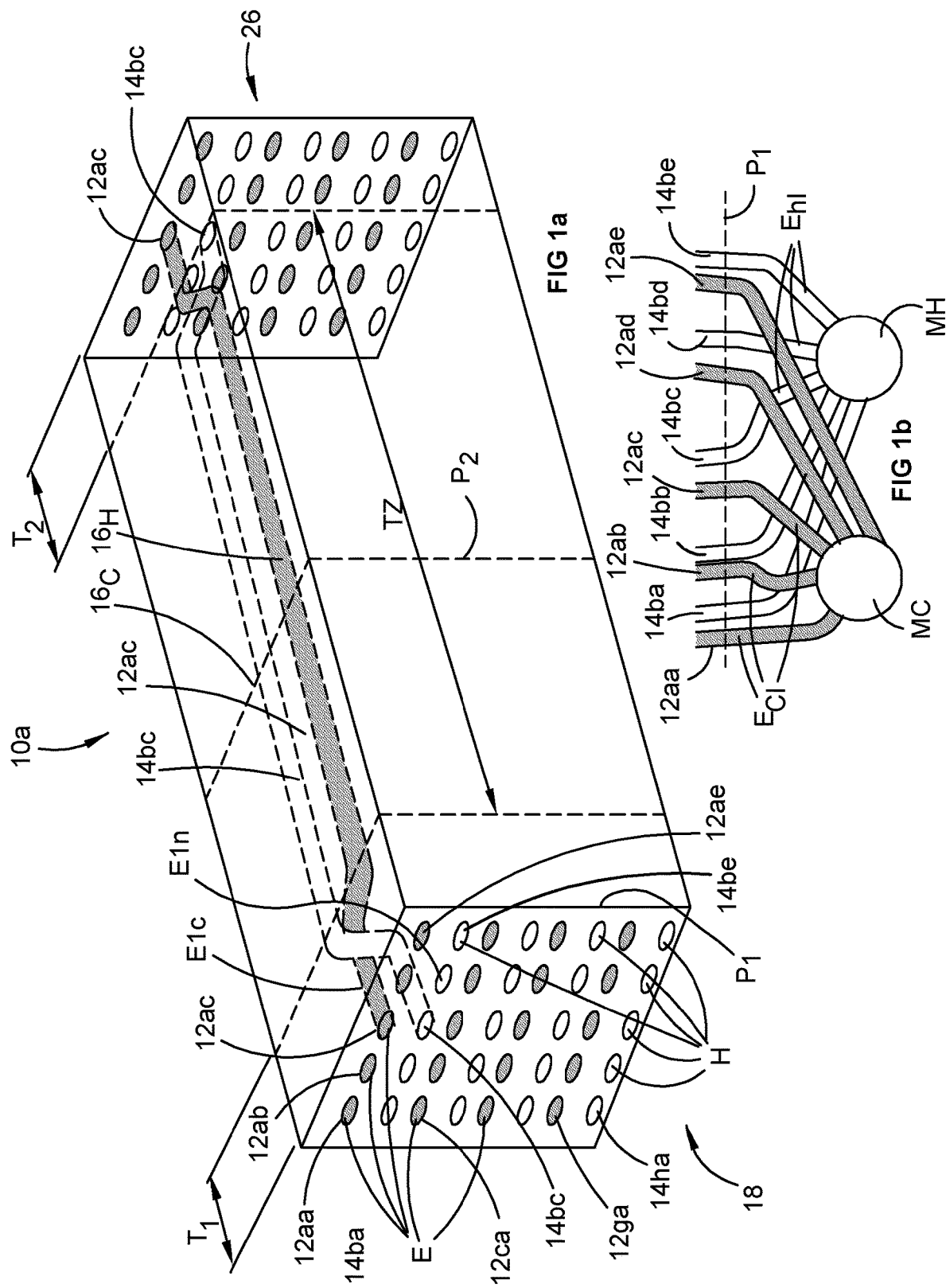

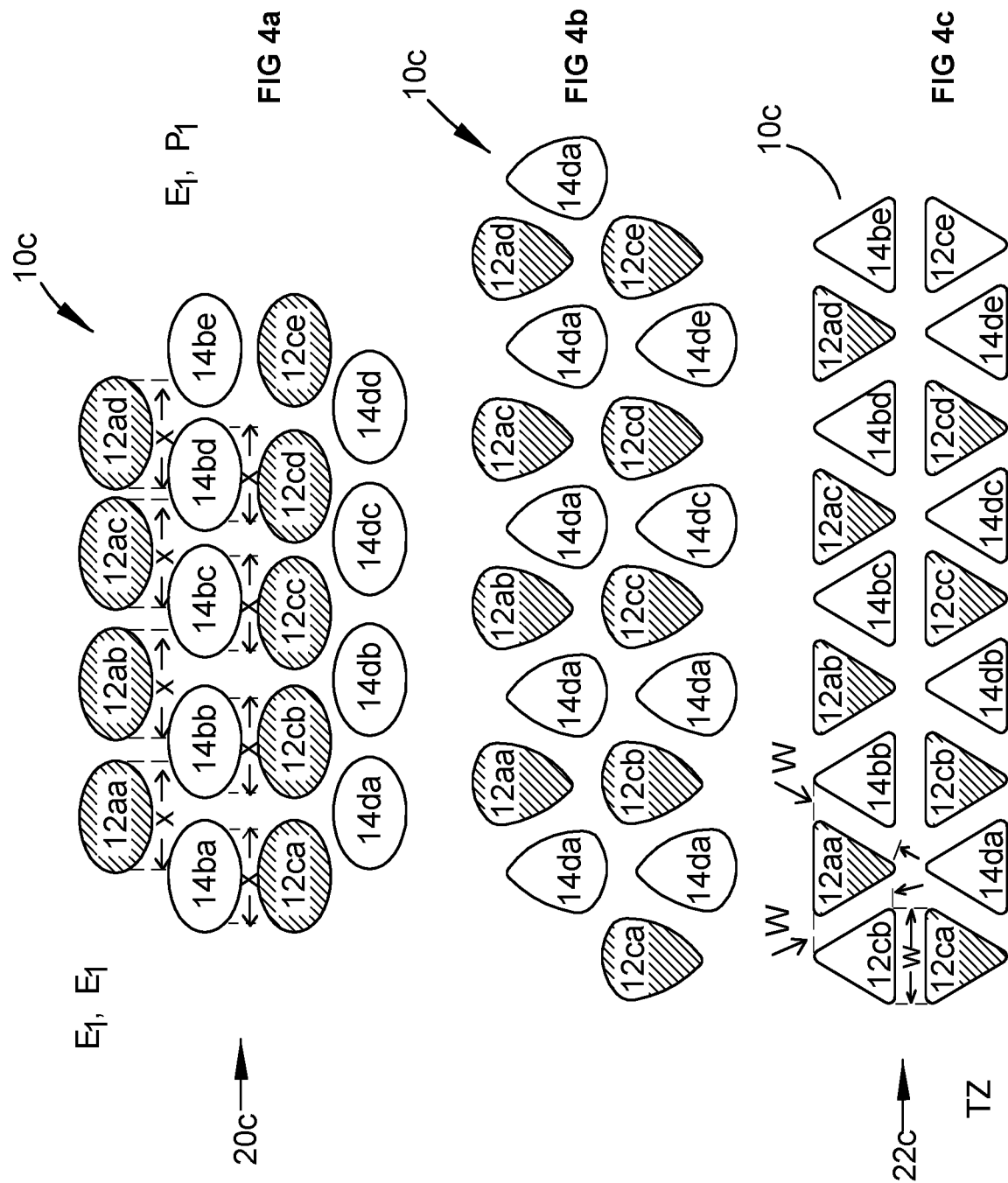

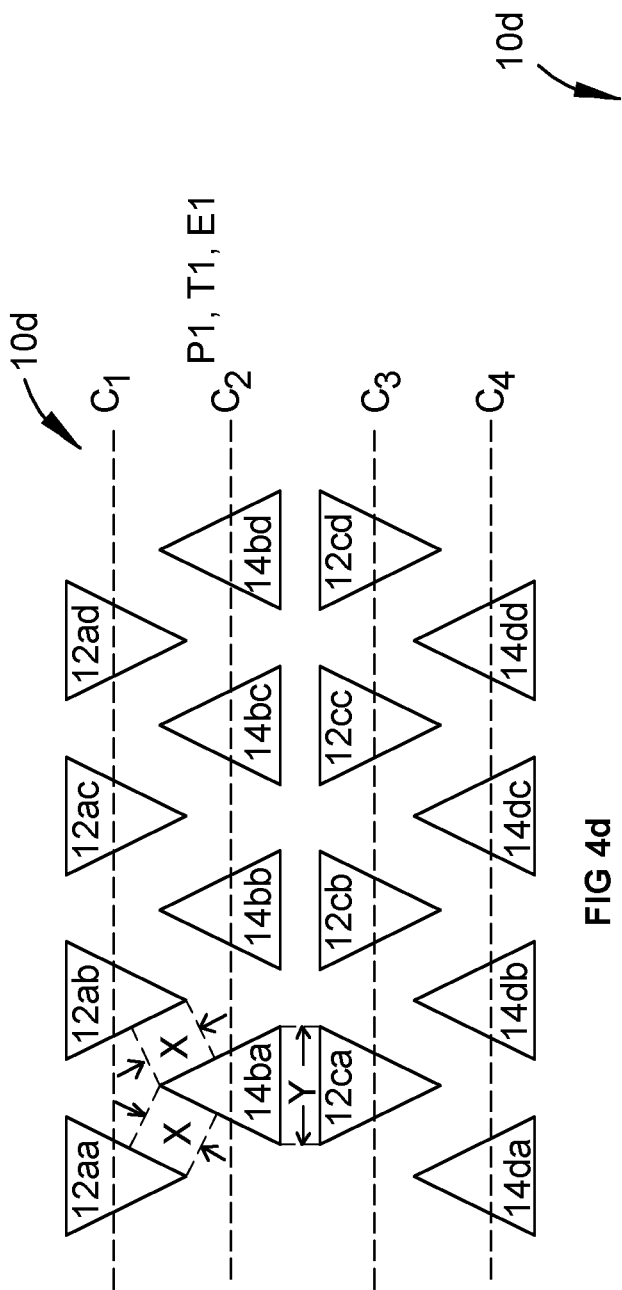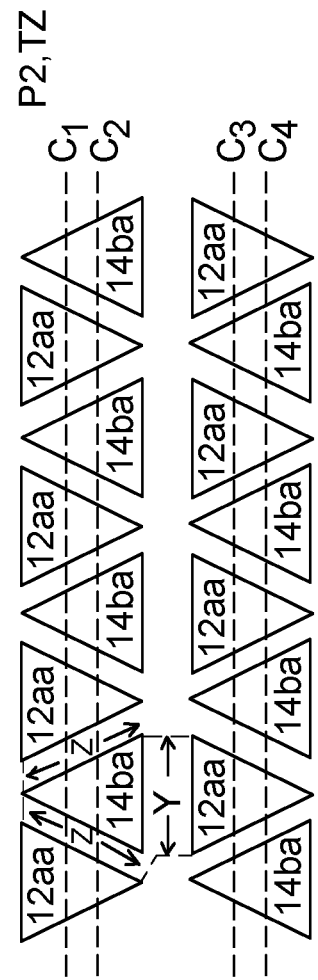
FIG 4d
FIG 4e

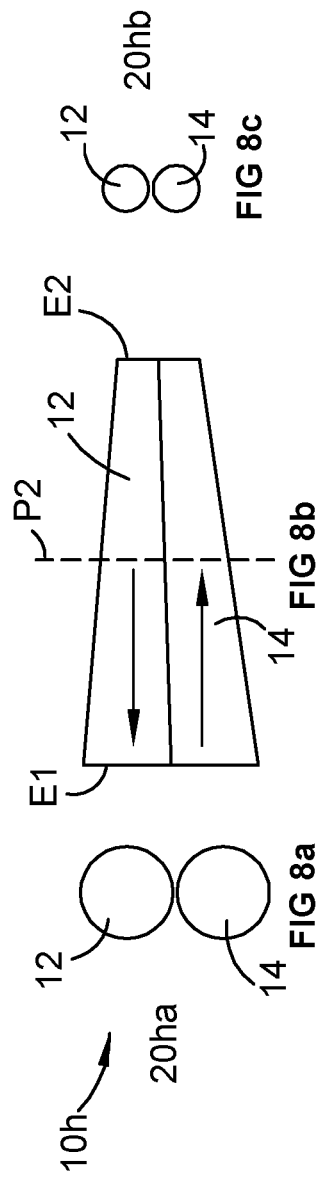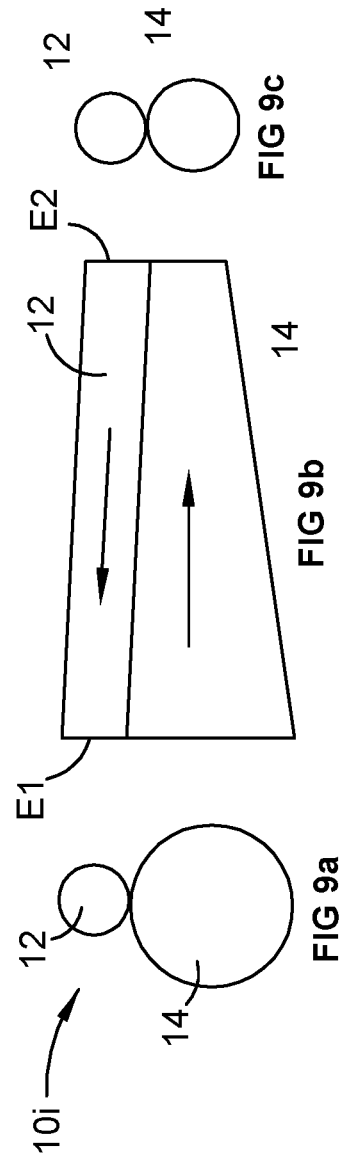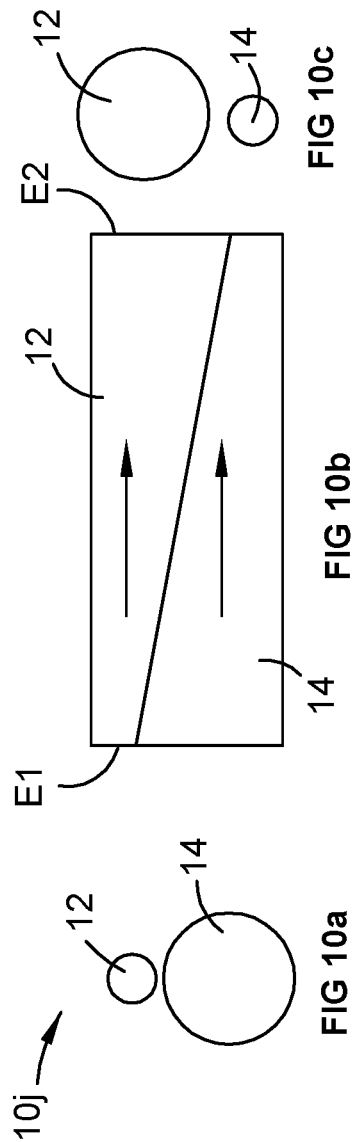

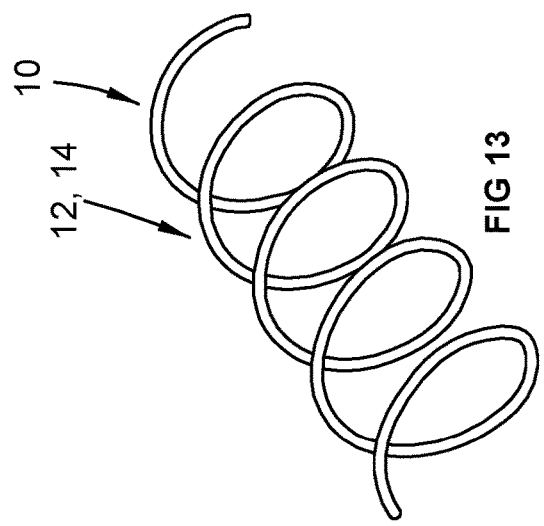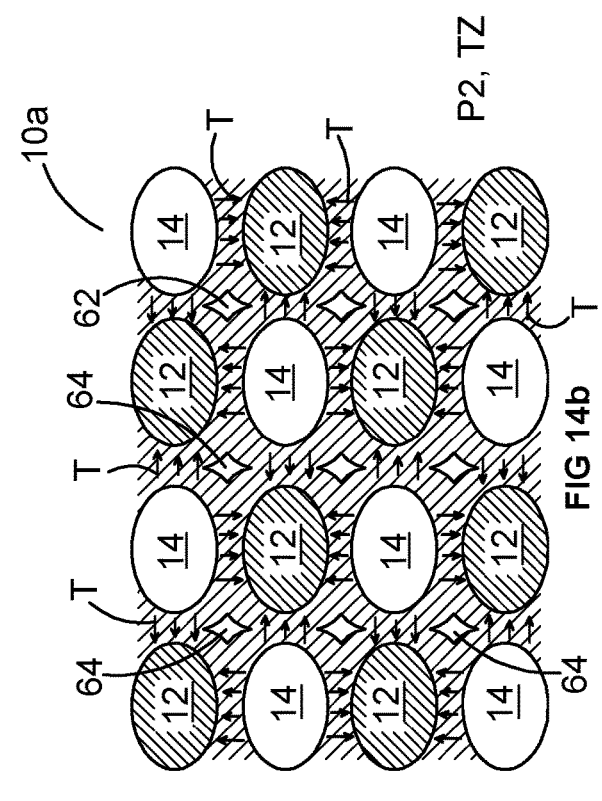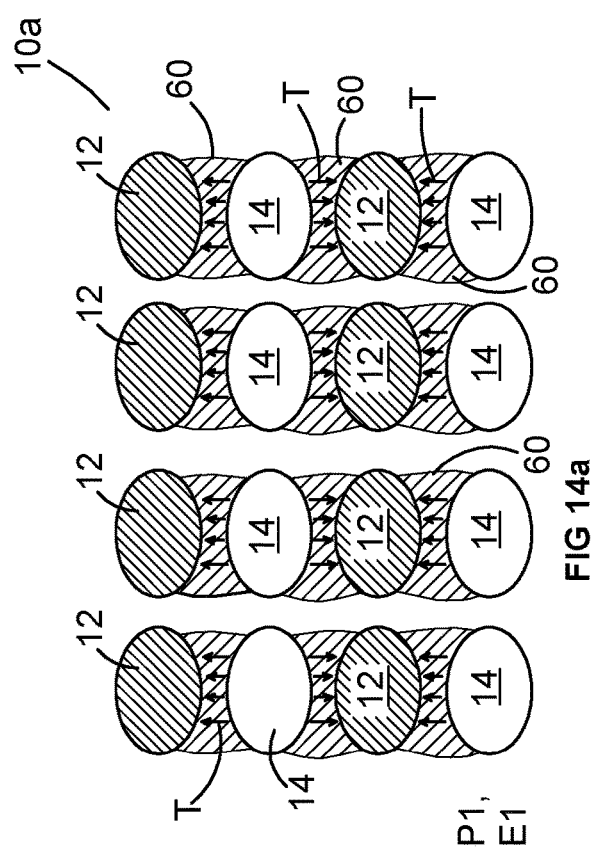

HEAT EXCHANGER AND METHOD OF MANUFACTURING A HEAT EXCHANGER

TECHNICAL FIELD

This specification discloses a heat exchanger and method of manufacturing a heat exchanger. The heat exchanger may be used for fluids including gases, liquids and two-phase fluid flows.

BACKGROUND ART

The function of many types of heat exchangers is to transfer as much heat as possible from one fluid to another fluid in as little space as possible, with as low a pressure drop (pumping loss) as possible. It would be desirable to configure the geometry of a given heat exchanger to suit a given rate of heat exchange, if there were a practical and feasible way to do so.

Printed Circuit Heat Exchangers have been produced to provide a compact type of heat exchanger as an alternative to traditional shell and tube heat exchangers for locations where space savings are required for example in industrial plants. Printed circuit heat exchangers are marketed as being four to six times smaller and lighter than conventional designs such as shell-and-tube exchanger.

Printed circuit heat exchangers are manufactured using flat metal plates that form the core structure of the heat exchanger. Fluid flow channels are 'printed' into the flat metal plates by etching or 'chemical milling'. These fluid flow channels are typically semicircular in cross section with a depth of 1.5 mm to 3 mm. The etched plates are then stacked on top of each other and diffusion bonded, converting the plates into a solid metal block containing the precisely engineered 'printed' fluid flow channels.

The plates are stacked such that there are alternate spacings between adjacent plates to form, respectively, the hot and cold fluid flow paths. The fluid flow paths within each plate carry the same kind of fluid at the same kind of temperature. Consequently, heat transfer only takes place between these adjacent plates. Whilst the manufacturers of printed circuit heat exchangers boast that they offer high heat transfer surface area per unit volume of the exchanger, resulting in reduced weight, space, and supporting structure, the manner in which the plates are stacked to form prior art printed circuit heat exchangers results in inherent inefficiencies in heat transfer.

Another disadvantage of printed circuit heat exchangers is that blockages of the fluid flow channels can easily occur because of the inherently small size of the channels which are typically in the range of 0.5 mm to 2 mm. Blockages require chemical cleaning which can be difficult in some installations. To avoid such blockages, it is known to install filtration devices so that the fluids entering the printed circuit heat exchanger are extremely clean. However, this adds to the overall cost of the system with maintenance of the filtration systems being required.

The above reference to the background art does not constitute an admission that the art forms part of the common general knowledge of a person of ordinary skill in the art. The above references are also not intended to limit the scope the application of the disclosed neat exchanger or its method of manufacture.

SUMMARY OF THE DISCLOSURE

In a first aspect there is disclosed heat exchanger comprising: a plurality of sets of fluid channels each fluid channel having first and second end portions and an intermediate portion between the first and second end portions, the first end portions in a plane perpendicular to a direction of fluid flow in the channels have respective end perimeters which are in a first configuration wherein adjacent end portions of different sets of fluid channels have a total first shared heat transfer length being a summation of lengths of mutually opposed perimeters of the adjacent end portions of the different sets; and wherein the intermediate portions in a plane transverse to the direction of fluid flow have respective intermediate channel perimeters, the intermediate portions having a second configuration with a total second shared heat transfer length, being a summation of lengths of mutually opposed channel perimeters of the adjacent channels of the different sets, and wherein the total second shared heat transfer length is different to the total first heat transfer length.

In one embodiment the heat exchanger comprises at least one group of reconfiguring channels each group of reconfiguring channels having at least two channels from mutually different sets of channels; and wherein the at least one group of reconfiguring channels is reconfigured relative to adjacent channels from the first configuration to the second configuration wherein total the second shared heat transfer length is different to total first shared heat transfer length.

In one embodiment the total second shared heat transfer length is greater than the total first shared heat transfer length.

In one embodiment each group of reconfiguring channels is progressively rotated or twisted about an axis parallel to a direction of flow of fluid through the channels.

In one embodiment each group of reconfiguring channels is progressively rotated or twisted to an extent so that the channels in the reconfiguring group are, in at least one plane perpendicular to a flow of fluid, transposed relative to their position at one of the ends of the corresponding channels.

In one embodiment the channels in the reconfiguring group are maintained in their transposed position for at least a quarter of a length of the intermediate portion of the channels in the reconfiguring group.

In one embodiment the channels in the reconfiguring group of channels have their first end portions arranged in the first configuration and their second end portions in the first configuration and wherein the reconfiguring group of channels is progressively rotated or twisted from their transposed position so that the second end portions of the channels are in the first configuration.

In one embodiment at least a first set of the plurality of sets of channels is configured to have a first cross sectional shape or area at the first end portion and a second cross sectional shape or area at at least one point in their respective intermediate portions wherein the first cross sectional shape or area is different to the second cross sectional shape or area so that the second configuration is different to the first configuration.

In one embodiment the change in cross sectional shape of the first set of channels is accompanied by a change in juxtaposition of first set of channels relative to a second set of the plurality of sets of channels.

In one embodiment the second cross sectional shape is arranged so that a perimeter of the first set of channels in lies adjacent to a perimeter of two or more channels of the second set of channels.

In one embodiment the second cross sectional shape is generally triangular.

In one embodiment the first cross sectional shape is selected from the group comprising: circle, ellipse, polygon with four or more sides and a rounded polygon with four or more sides.

In one embodiment at least a second set of the plurality of sets of channels is configured to have a third cross sectional shape or area at the first end portion and a fourth cross sectional shape or area at at least one point in their respective intermediate portions wherein the fourth cross sectional shape or area is different to the third cross sectional shape or area so that the second configuration is different to the first configuration.

In one embodiment in the first configuration the first end portions of the channels are arranged in alternating planes of channels so that each plane contains only channels from the same set of channels, and in the second configuration the channels are arranged in a chequerboard configuration wherein respective planes of channels include channels from different sets of channels.

In one embodiment the first configuration is a matrix comprising alternating rows of channels of different sets so that each row in the matrix comprises only channels of the same set and wherein the channels in the matrix are aligned in columns, and wherein mutually adjacent columns of channels are progressively offset relative to each other in a direction of the columns from the first ends to the intermediate portion so as to be arranged in the chequerboard configuration.

In one embodiment a cross sectional area of one or more channels in at least one of the sets of channels changes for at least a portion of the length of the one or more channels from the end portion to the intermediate portion.

In one embodiment a cross sectional shape of one or more channels in at least one of the sets of channels changes for at least a portion of the length of the one or more channels from the end portion to the intermediate portion.

In one embodiment the plurality of sets of fluid channels comprises a first set of channels and a second fluid channels and wherein in the first configuration the first end portions of the first set of channels have a first spacing from the first end portions of the second set of channels and in the second configuration the intermediate portions of the first set of channels have a second spacing from the intermediate portions of the second channels wherein the second spacing is less than the first spacing.

In one embodiment one or more of the channels in at least one of the sets of channels follow a three-dimensional helical or spiral path.

In one embodiment an internal surface of the at least one channel in at least one of the sets of channels is arranged to induce turbulence in fluid when flowing through the at least one first channel.

In one embodiment the internal surface of the at least one channel is one, or a combination of any two or more, of: (a) roughened; (b) provided with one or more grooves; (c) provided with one or more protruding ridges or rib; (d) provided raised dimples; and (e) provided with one or more fins; to induce turbulence in a fluid when flowing through the at least one first channel.

In one embodiment least one channel in at least one of the sets of channels has a channel wall of a thickness that varies at at least one point in comparison to another point in that channel spaced upstream or downstream from the one point.

In one embodiment a first set of the channels has a first number of channels and a second set of channels has a second number of channels wherein the first number is different to the second number.

In one embodiment one or more of the channels in at least one of the sets of channels progressively changes in cross-sectional area from one end portion to an opposite end portion.

In one embodiment one or more of the channels in at least one of the sets of channels cyclically varies in cross sectional shape or area along a portion of a length of the channel.

In one embodiment the heat exchanger comprises a first inlet header and a first outlet header connected to the first end portions in the second end portions of a first set of channels; and a second inlet header and a second outlet header connected to the first end portions in a second end portions of a second set of channels; and wherein the headers are arranged to provide a counter-flow of fluid through the first set of channels and the second set of channels.

In one embodiment the heat exchanger comprises one or more passages which provide fluid communication between two or more channels in a common set of channels.

In a second aspect there is disclosed heat exchanger comprising:
  a plurality of first fluid channels through which a first fluid can flow;
  a plurality of second fluid channels through which a second fluid can flow;
  and wherein for at least two points, one downstream of the other along a length of at least one of the first channels, one or both of a cross sectional area and a cross sectional shape of the least one of the first channels at one of the two points is different to that at the other of the two points.

In a third aspect there is disclosed a heat exchanger comprising:
  a plurality of first fluid channels through which a first fluid can flow;
  a plurality of second fluid channels through which a second fluid can flow;
  and wherein one or more first channels comprise respective lengths that follow a three-dimensional spiral path.

In a fourth aspect there is disclosed a heat exchanger comprising:
  a plurality of first fluid channels through which a first fluid can flow;
  a plurality of second fluid channels through which a second fluid can flow; and wherein at least one first channel has a first channel wall of a thickness that varies at at least one point in comparison to another point spaced along the first channel.

In a fifth aspect there is disclosed a heat exchanger comprising:
  a plurality of first fluid channels through which a first fluid can flow;
  a plurality of second fluid channels through which a second fluid can flow; wherein an internal surface of at least one first channel is arranged to induce turbulence in the first fluid when flowing through the at least one first channel.

In one embodiment the internal surface of the at least one first channel is one, or a combination of any two or more, of: (a) roughened; (b) provided with one or more grooves; (c) provided with one or more protruding ridges or rib; (d) provided with raised dimples; and (e) provided with one or more fins; to induce turbulence in a fluid when flowing through the at least one first channel.

In a sixth aspect there is disclosed a heat exchanger comprising:
  a plurality of first fluid channels through which a first fluid can flow;

a plurality of second fluid channels through which a second fluid can flow;

and wherein one or both of a cross sectional area and a cross sectional shape of at least one first channel cyclically varies for at least a portion of the at least one first channel from a first end of the at least one first channel to a second opposite end of. the at least one first channel In a seventh aspect there is disclosed a heat exchanger comprising:

at least a first set of channels and a second set of channels, the first set of channels forming first flow paths for carrying a first fluid and the second set of channels forming second flow paths for carrying a second fluid;

a first wall surface area being a total surface area of material in the heat exchanger lying in a heat flow path between channels in the first and second sets in a first plane of the heat exchanger perpendicular to the first flow paths; and a second wall surface area being a total surface area of material in the heat exchanger lying in a heat flow path between the first and second sets in a second plane of the heat exchanger perpendicular to the first flow paths, the second plane being either upstream or downstream of the first plane;

wherein the first wall surface area is different to the second wall surface area.

In one embodiment of the heat exchanger (a) the first and second sets of channels are in different positions relative to each other in the first plane compared to the second plane; or (b) a cross-sectional area or shape of at least one of the first and so second sets of channels is different in the first plane compared to the second plane.

In one embodiment the heat exchanger comprises a first fluid Inlet header and first fluid outlet fluid header at opposite ends of the first sets of channels and a second fluid inlet header and a second fluid outlet header at opposite ends of the second sets of channels and wherein the first and second channels are arranged in alternating planar arrays adjacent the respective headers.

In an eight aspect there is disclosed method of manufacturing a heat exchanger having at least two sets of channels comprising:

using an additive manufacturing technique to progressively build at least a main body of the heat exchanger the main body being provide a plurality of sets of fluid flow channels, each channel defining a respective fluid flow path having a first end portion, a second end portion and an intermediate portion;

wherein the configuration of the plurality of sets of channels that one of the end portions is different to the configuration of the set of channels in the intermediate portion.

In one embodiment the method comprises using the additive manufacturing technique to progressively build respective headers for the end portions of each of the sets of channels.

In one embodiment the method comprises building the headers in a continuous process with the building of the main body.

In one embodiment the method comprises constructing the headers separate to the main body and subsequently attaching the headers to the main body.

In one embodiment the method comprises utilising the additive manufacturing technique to progressively build at least two sets of fluid flow channels in a manner wherein one or more of a (a) position of at least one first channel relative to at least one second channel varies between two spaced apart points along a fluid flow path of the first channel; (b) a cross-sectional shape of at least one first channel varies between two spaced apart points along a fluid flow path of the first channel; and (c) a cross-sectional area of at least one first channel varies between two spaced apart points along a fluid flow path of the first channel.

In one embodiment the method comprises utilising the additive manufacturing technique to form an internal surface of at least one first channel in a manner to induce turbulence in a fluid when flowing through the at least one first channel.

In a ninth aspect there is disclosed a method of constructing a heat exchanger of any one of the first to seventh aspects comprising progressively building the plurality of sets of channels using an additive manufacturing technique.

Various features of the above aspects are defined in the dependent claims annexed to this specification and are incorporated in the Summary by way of reference.

BRIEF DESCRIPTION OF THE DRAWINGS

Notwithstanding any other forms which may fall within the scope of the heat exchanger as set forth in the Summary, specific embodiments will now be described, by way of example only, with reference to the accompanying drawings, in which:

FIG. 1a is a perspective view of an embodiment of a portion of the disclosed heat exchanger;

FIG. 1b is a schematic representation of a manifold/header arrangement of the heat exchanger shown in FIG. 1a;

FIGS. 4a to 4c depict cross sectional profiles of fluid channels in various planes of the heat exchanger extending from an end portion of the channels in a transition zone of the heat exchanger to an intermediate portion of the channels in a heat transfer zone of the heat exchanger and showing a third technique for reconfiguration of the channels from the transition zone to the heat transfer zone in which the cross sectional shape or profile of the channels together with their relative juxtaposition changes;

FIGS. 4d and 4e depict cross sectional profiles of fluid channels in various planes of a disclosed heat exchanger extending from an end portion of the channels in a transition zone of the heat exchanger to an intermediate portion of the channels in a heat transfer zone of the heat exchanger and showing a fourth technique for reconfiguration of the channels from the transition zone to the heat transfer zone in which the cross sectional shape or profile of the channels remains constant but their relative juxtaposition changes;

FIG. 6b depicts one possible starting configuration of the different sets of channels for the embodiment of the heat exchanger shown in FIG. 6a, here the starting shape of the end portions of the channels in different sets is the same as that in the intermediate portion shown in FIG. 6a;

FIGS. 8a to 8c depict an arrangement of channels in respective different sets of channels in a further embodiment of the disclosed heat exchanger where the channels are reconfigured from a first end portion to a second opposite end portion by way of a progressive change in cross-sectional area for channels in both set of channels;

FIGS. 9a to 9c depict an arrangement of channels in respective different sets of channels in a further embodiment of the disclosed heat exchanger in which the sets of channels are reconfigured from a first end portion to a second opposite end portion where the reconfiguration is manifested by a progressive change in cross-sectional area for a channel in one set of channels with the cross-sectional area for a channel in the other set of channels remaining constant;

FIGS. 10a to 10c depict an arrangement of channels in respective different sets of channels in a further embodiment of the disclosed heat exchanger in which the sets of channels are reconfigured from a first end portion to a second opposite end portion where the reconfiguration is a progressive increase in cross-sectional area for channels in one set of channels and a progressive decrease in cross-sectional area for channels in the other set of channels

FIG. 13 is a schematic representation of a fluid flow channel that follows a three-dimensional spiral path and may be incorporated in a further embodiment of the disclosed heat exchanger; and FIGS. 14a and 14b depict cross sectional profiles of fluid channels in identical configurations that shown in FIGS. 2a and 2d respectively but highlighting the cross-sectional area of the material of the heat exchanger through which heat is transferred between fluids flowing in the respective channels in spaced apart perpendicular planes of the heat exchanger.

DESCRIPTION OF SPECIFIC EMBODIMENTS

Figure 2A:
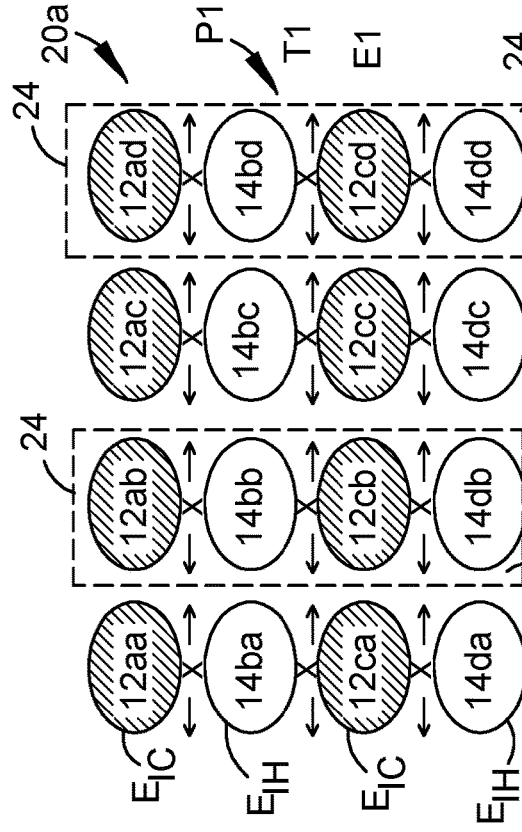
FIGS. 2a to 2d depict cross sectional profiles of fluid channels in planes of the heat exchanger extending from an end portion of the channels in a transition zone of the heat exchanger to an intermediate portion of the channels in a heat transfer zone of the heat exchanger and showing one technique for reconfiguration of the channels from the transition zone to the heat transfer zone in which groups of channels are twisted or rotated.

Specific embodiments of the disclosed heat exchanger will now be described by way of example only. The terminology used herein is for the purpose of describing particular embodiments only, and is not intended to limit the scope of the disclosed heat exchanger. Unless defined otherwise, all technical and scientific terms used herein have the same meanings as commonly understood by one of ordinary skill in the art to pertaining to heat exchangers. In the drawings, it should be understood that like reference numbers refer to like parts.

Before one embodiment of the disclosed heat exchanger is explained in detail, it is to be understood that the disclosed heat exchanger is not limited in its application to the details of construction and the arrangements of components set forth in the following description or illustrated in the drawings. The disclosed heat exchanger is capable of other embodiments and of being practiced or being carried out in various ways. Also, it is to be understood that the phraseology and terminology used herein is for the purpose of description and should not be regarded as limiting.

The term 'fluid' as used herein refers to a gas or a liquid or a two phase mixture of gas and liquid.

Rotated or Twisted Channels

FIGS. 1a-2d depict a first embodiment of the disclosed heat exchanger 10a. The heat exchanger 10a comprises a plurality of sets of fluid channels. In this particular embodiment there are two sets of fluid channels H and C. For convenience the set of channels H may be considered as a set of channels for carrying a hot fluid while the set of channels C may be considered as a set of channels for carrying a cold fluid. The channels in the set H are depicted as channels with white ends while the channels in the set C are depicted as shaded.

The individual channels in the set C are denoted as channels 12ij where ij denote matrix positions which are referenced by letters a-z. In FIG. 1a at the top left hand corner there is a channel 12aa and at a right-hand end of the same row there is a channel 12ae. However collectively and in general the channels 12ij are hereinafter referred to as channels "12".

The individual channels in the set H are denoted as channels 14ij where ij denote matrix positions which are referenced by letters a-z. In FIG. 1a near the top left hand corner there is a channel 14ba and at a right-hand end of the same row there is a channel 14be. However collectively and in general the channels 14ij are hereinafter referred to as channels "14".

Each of the channels 12, 14 has a first end portion E1C, E1H and a second end portion E2C, E2H respectively (hereinafter referred to collectively and in general as "first end portions E1" and "second end portions E2"; further, for ease of description the end portions in a general sense, whether they be the first end portions or the second end portions, are referred to hereinafter as "end portions E").

In between the end portions E each channel 12, 14 has an intermediate portion 16C, 16H respectively (hereinafter referred to collectively and in general as "intermediate portions 16").

The end portions E1C of the channels 12 at one end 18 of the heat exchanger 10a in the set C are connected to and are in fluid communication with a manifold MC. The end portions E1H of the channels 14 at the same end 18 of the heat exchanger 10a in the set H are connected to and are in fluid communication with a manifold MH.

The first end portions E1 in a plane P1 perpendicular to the direction of flow of fluid through the heat exchanger 10a have a first configuration 20a as shown in FIG. 2a. It will be noted that in this configuration adjacent channels of different sets H and C have a shared heat transfer length X. This is in effect the shared boundary or perimeter length between the walls of adjacent channels in the different sets. Thus looking at FIG. 2a the channels 12aa and 14ba have a shared heat transfer length X; as do channels 12ab and 14bb; 12ac and 14bc; 12ad and 14bd; 14ba and 12ca, et cetera. So in this example there is a total first shared heat transfer length of 12X being the summation of the length of mutually opposed perimeters of the adjacent end portions of the different sets C and H.

Figure 2B:
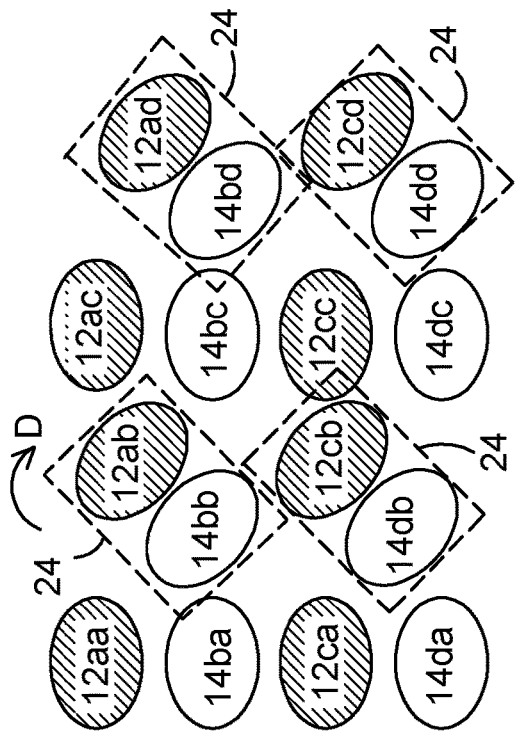
Figure 2C:
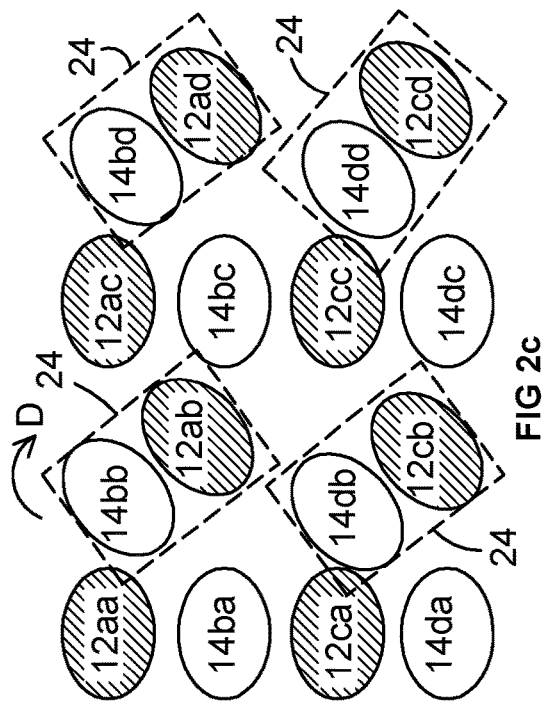
Figure 2D:
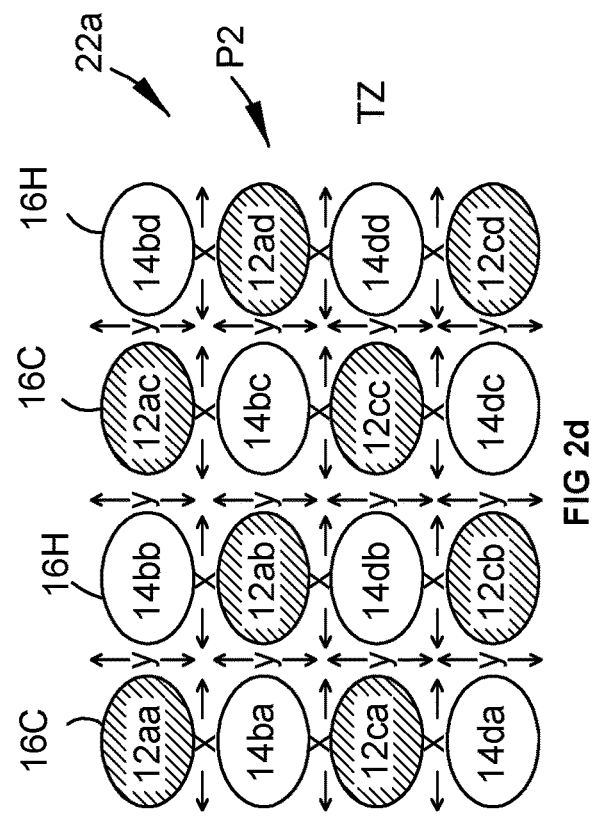

FIG. 2d shows the intermediate portion 16 of the channels in the sets C and H in a plane P2 perpendicular to the direction of flow of fluid through the channels. It will be noted here that channels 12, 14 are now in a second configuration 22a which is different to the first configuration shown in FIG. 2a. The effect of this change in configuration is that now mutually adjacent channels of different sets C and H have a different, and in this particular embodiment increased, shared heat transfer length.

The change in the shared heat transfer length between channels in different sets C and H arises through a reorientation of the channels 12 and 14 so that now each channel in any set is adjacent to more than one channel of a different set. For example with reference to FIG. 2d the channel 12aa in the set C is now adjacent to channels 14bb and 14ba in the set H. As a consequence there is a shared heat transfer length X between the channel 12aa and the channel 14ba, and a shared heat transfer length Y between the channel 12aa and channel 14bb.

Carrying this analysis through for the entire configuration 22a the total shared heat transfer length between the channels, (which is the summation of the length of mutually opposed channel perimeters of adjacent channels of different sets H and C) is 12X+12Y. Thus the shared heat transfer length is different between two points along the fluid flow path. In particular in this embodiment the shared is heat transfer length increased by 12Y from the end 18 to the intermediate plane P2. This provides greater heat transfer efficiency than the configuration 20a shown in FIG. 2a.

In order to reconfigure the pattern of the channels from the configuration 20a to the configuration 22a at least one group of reconfiguring channels 24 is formed or selected. Each group of reconfiguring channels has at least two channels from mutually different sets of channels C and H. For example FIG. 2b shows four groups of reconfiguring channels 24. These groups comprise channels 12ab and 14bb; 12ad and 14bd; 12cb and 14db; and 12cd and 14dd. Each group of the reconfiguring channels 24 has one channel 12 from the set C and one channel 14 from the set H. The effect of reorientation of the groups of channels 24 is to increase the shared heat transfer length of the channels 12, 14 from that in the configuration 20a to that in configuration 22a.

In this embodiment the reconfiguration is in the form of a progressive rotation or twisting of the reconfiguring groups 24 about an axis parallel to a direction of flow of fluid through the channels 12, 14. The progressive rotation is illustrated in the sequence of FIGS. 2a-2d, where the respective groups 24 are rotated in the clockwise direction shown by arrow D by 180° from their positions in the first configuration 20a to the second configuration 22a.

The reconfiguration of the channels 12, 14 from the first configuration 20a to second configuration 22a occurs over a transition zone T1 at one end of the heat exchanger 10a. As explained further below, in this embodiment there is a further reconfiguration of the channels 12, 14 from the second configuration 22a back to the first configuration 20a over a second transition zone T2 at an opposite end of the heat exchanger 10a.

In between the transition zones T1 and T2 there is a main heat exchanger zone TZ where the channels 12, 14 are maintained in the second configuration 22a. To maximise heat transfer the length of the zone TZ should be as long as possible in comparison to the overall flow path length of fluid flowing through the heat exchanger 10a. In one example the channels 12, 14 are maintained in the second configuration 22a, i.e. where the reorientated groups are maintained in their transposed positions, for a length of at least one quarter of the length of the fluid flow path through the heat exchanger 10a.

In this embodiment at a second end 26 of the heat exchanger 10a the second end portions E2 of the channels 12, 14 are also in the first configuration 20a. The reconfiguration of the channels from the second orientation 22a in heat transfer zone Z to the first configuration 20a at the end 26 occurs through the second transition zone T2. This reconfiguration can occur in one of two ways. Either the reorientated groups 24 can be rotated or twisted about an axis parallel to the direction of fluid flow in the clockwise direction D through 180° alternately they may twisted or rotated in the anticlockwise direction by 180°.

In this specific embodiment the end portions E1 of channels 12 in the first set C may be, or are otherwise connected to, outlets while the end portions E1 of the channels 14 in the second set H may be, or are otherwise connected to, inlets. Conversely the end portions E2 the first of channels 12 in the first set C are inlets while the end portions E2 of the channels 14 in the second set H are outlets. As recognised by those skilled in the art with this arrangement of inlets and outlets the heat exchanger 10a is arranged as a counter-flow heat exchanger.

In an alternate embodiment it is possible to arrange the ends E1 of both channels 12 and 14 to be inlets and the ends E2 to of the channels to be outlets in which event the heat exchanger would be a parallel or concurrent flow heat exchanger. However this has less thermal efficiency than the counter-flow heat exchanger.

In the present embodiment in the first orientation 20a the channels 12, 14 are arranged in alternating rows or planes of channels of the same type. Thus with reference to FIG. 2a there is a top row or plane of channels 12aa-12ad in the set C, beneath this is a row of channels 14ba-14bd from the set H, beneath this is a row of channels 12ca-12cd from the set C, et cetera. This arrangement facilitates the connection of planes of channels of the same type to a corresponding manifold MC or MH in a header section of the heat exchanger 10a. In the second configuration 22a the channels 12, 14 may be considered to be in a chequerboard arrangement or configuration.

Progressive Relative Linear Translation

There are alternate ways of reconfiguring the channels 12, 14 in the sets C and H so that the total first shared heat transfer length is different to the total second shared heat transfer length to thereby control heat transfer between fluids in the heat exchanger.

Figure 3:
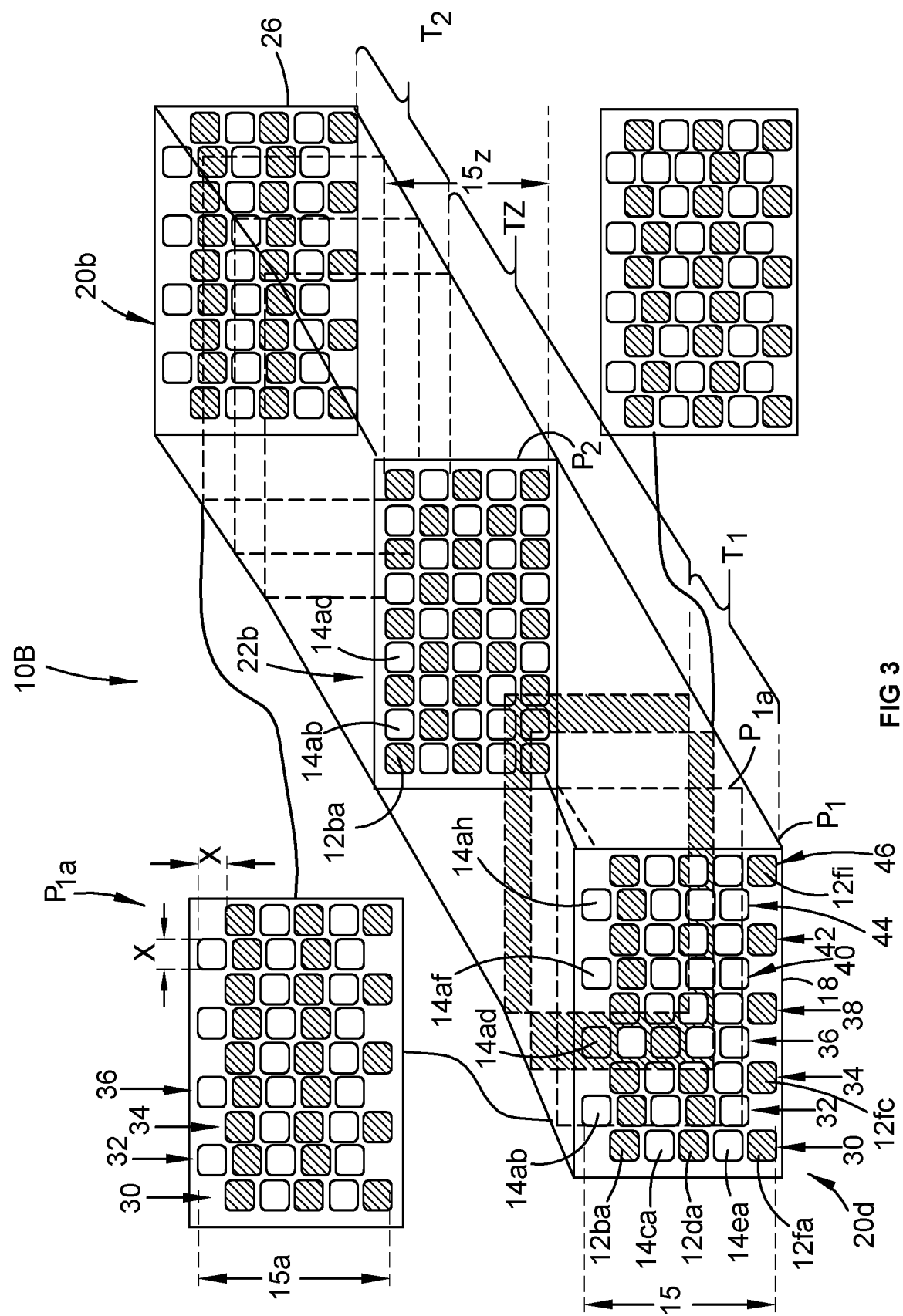
FIG. 3 depicts cross sectional profiles of fluid channels in planes of the heat exchanger extending from an end portion of the channels in a transition zone of the heat exchanger to an intermediate portion of the channels in a heat transfer zone of the heat exchanger and showing a second technique for reconfiguration of the channels from the transition zone to the heat transfer zone in which groups or columns of channels are linearly translated relative to each other.

One of these alternatives is shown in FIG. 3 which shows a second embodiment of the heat exchanger 10b. The heat exchanger 10b comprises a first set C of channels 12 and a second set H of channels 14. In the first configuration 20b at an end 18 the channels 12 and 14 are again arranged in alternating rows or planes. However in the very top row there are only four channels 14 and in the very bottom row there are only five channels 12. The channels 12 and 14 in the top and bottom rows are in alternate columns and staggered with respect to each other. In between the top and bottom rows there are nine channels of the same type in alternating rows or planes.

In this embodiment each of the channels 12, 14 have a cross sectional shape in the form of a rounded quadrilateral (and more particularly a square) with side lengths X. In the first configuration 20b in plane P1 the total first shared heat transfer length is 36X. This is a made up as follows:

- between the rows commencing with the channels 12ba and 14ca there is a shared heat transfer length of 9X,
- between the rows commencing with the channels 14ca and 12da there is a shared heat transfer length of 9X,
- between the rows commencing with the channels 12da and 14ea there is a shared heat transfer length of 9X,
- between the rows commencing with the channels 14ab and 12ba there is a shared heat transfer length of 4X, and
- between the rows commencing with the channels 14ea and 12fa there is a shared heat transfer length of 5X.

Hence the summation of the length of mutually opposed perimeters of channels in the different sets C and H is: 9X+9X+9X+4X+5X=36X.

In the second configuration 22b the channels 12, 14 are in the chequerboard configuration and have a total second shared heat transfer length of 76X. This is made up as follows:

- between respective adjacent rows of channels 12, 14 there is a shared heat transfer length of 9X, there are four sets of respective adjacent rows of channels and therefore the rows of channels contribute four lots of 9X, i.e. 36X of the shared heat transfer length,
- between adjacent columns of channels 12, 14 there is an additional 5X of shared heat transfer length and there are eight lots of respective adjacent columns thus the columns contribute eight times 5X i.e. 40X of the shared heat transfer length.

Hence the summation of the length of mutually opposed perimeters of channels in different sets C and H is 36X+40X=76X.

In the heat exchanger 10b the reconfiguration of channels between the first configuration 20b and the second configuration 22b is by a progressive relative linear translation or offset of channels in mutually adjacent columns or groups in opposite directions. This progressive offset is at a maximum at the ends 18 and 26 coinciding with the beginning of the transition zone T1 and the end of the transition zone T2. The offset is at a minimum in the heat transfer zone TZ.

For example looking at FIG. 3 in a plane P1 there is a transverse distance 15 between the top of the channels 14 in the top row to the bottom of the channels 12 in the bottom row. In the plane P1 this distance is marked as 15a and in the plane P2 this distance is marked as 15z.

The relationship between these distances is as follows: 15>15a>15z, so that the distance reduces to a minimum in the heat transfer zone TZ. When moving from the heat transfer zone TZ to the end of the transition zone T2 the progressive relative linear translation between the columns of channels is reversed so that at the end 26 the channels 12, 14 are once again arranged in separate planes in the configuration 20b.

The progressive relative translation between the mutually adjacent columns of channels may be effected for example by translating a first set of the columns 30, 34, 38, 42 and 46 in an upward direction relative to the intervening columns 32, 36, 40 and 44 when moving along the heat exchanger from the end 18 to the heat transfer zone TZ. The reverse translation may then occur from an opposite end of the heat transfer zone TZ to the end of the transition zone T2 at end 26.

Naturally the same effect can be achieved by alternate translations for example translating the intervening columns in a downward direction relative to the first set of columns; or translating the first set/group of the columns in an upward direction and the intervening set/group of columns in the downward direction.

Change of Channel Shape or Cross-Sectional Profile

Another way of reconfiguring the channels 12, 14 in the sets C and H so that the total first shared heat transfer length is different to the total second shared heat transfer length is to reconfigure or otherwise change the cross sectional shape of one or both of the channels 12, 14 from the end portions E to the intermediate portion 16.

One example of this is shown in the heat exchanger 10c in FIGS. 4a to 4c. Here the channels 12 and 14 are of a generally elliptical cross sectional shape or profile at the first and second end portions E1 and E2 and arranged in alternate rows or layers so as to have a first configuration similar to that of the channels 12, 14 in the first embodiment of the heat exchanger 10a shown in FIGS. 1a-2d. However the cross sectional shape or profile of the channels 12 and 14 changes to a generally triangular shape or profile in the intermediate portion 16 coinciding with the heat transfer zone TZ. The reconfiguration is also accompanied by a progressive shifting of the channels 12 and 14 so as to occupy or reside in one half of the number of rows in the heat exchange zone Z as compared to the number of rows in the transition zones T1 and T2.

FIG. 4a shows the end portions E1 of the channels 12 and 14 in a first configuration 20c at an equivalent location to the plane P1 of FIG. 1a. (The same configuration would exist in the end portions E2.) The number of channels in each row also alternates by one for adjacent rows in the same set C or H. For example in this specific embodiment there are four channels 12 in the first row and five channels 12 in the third row. If there were two further rows in the heat exchanger 10c then the next row of channels 12 below the row starting with channel 14da would have only four channels, and the subsequent row of channels 14 would have five channels. Similarly the number of channels 14 alternates between four and five.

FIG. 4b shows the configuration of the channels 12 and 14 transitioning from the initial configuration shown in FIG. 4a to the configuration FIG. 4c.

FIG. 4c shows the channels 12 and 14 in the second configuration in the heat exchange zone Z. The cross sectional shape or profile of the channels 12, 14 is now changed to a rounded equilateral triangular shape. Additionally the channels 12 and 14 from mutually adjacent rows have merged in alternating fashion to form a single row. This has the effect of reducing the total number of rows of channels 12, 14 by half in the heat exchange zone Z.

Comparing the first and second shared heat exchange length in the first and second configurations 20c, 22c can be seen that:

- the total first shared heat exchange length (shown in FIG. 4a) is approximately 13X, while the total second shared heat exchange length (shown in FIG. 4c) is about 21W, where W is the length of any side of the triangular shaped channels in the intermediate portion 16. (The second shared heat exchange length will be greater than 21W due to the adjacency of the apexes in adjacent pairs of channels of different rows, e.g. the apex of channel 12aa has a common heat transfer perimeter with the facing apex of channel 14da)

Thus provided W>(13/21)X, or stated another way provided W>62% X then the second shared heat exchange length is greater than (and therefore different to) the first shared heat exchange length resulting in a greater degree of heat exchange in the heat exchange zone Z. It is envisaged that in embodiments of the system 10c the dimension W may be arranged to be in the order of 65% to 95% of X.

In a more general sense the above describes an embodiment of the disclosed heat exchanger 10 comprising a plurality of first fluid channels 12 through which a first fluid can flow, a plurality of second fluid channels 14 through which a second fluid can flow and where for at least a length of each first channel 12 a cross sectional area of each first channel progressively changes.

In this particular example the area changes from $\pi XY/2$ for the channels 12 at the end portion E1 to about $W^2/2$ for the equilateral triangular shape of the channels 12 in the heat transfer zone Z. Of course in this embodiment the channels 14 also undergo the same change in cross-sectional area and indeed cross sectional shape.

Additionally or alternately the above described embodiment of the heat exchanger 10c in FIGS. 4a and 4b may also be seen as one in which the cross sectional shape of the first or second or both channels 12, 14 progressively change in cross sectional shape from a shape having N sides (in this instance the ellipses at the end portions E may be considered as having an infinite number of sides) to a shape having M sides in the heat transfer zone Z (in this instance three sides for the equilateral triangles). Thus in a general sense the cross sectional shape changes from N sides to M sides where N≠M. A further example of such an embodiment is described later in this specification with reference to FIGS. 6a and 6b.

Change in Spacing Between Sets of Channels

A further mechanism by which the rate of exchange of heat can be varied by change in the configuration of sets of channels is by varying the spacing between sets of channels. This is illustrated in FIGS. 4d and 4e which depict an embodiment of a heat exchanger 10d in two spaced apart planes P1 and P2 respectively. The planes P1 and P2 are at the same relative locations in the exchanger 10d as shown in heat exchanger 10a of FIG. 1a and lie in the transition zone T1 and heat transfer zone TZ respectively.

FIG. 4d shows the first end portion of the channels 12 and 14 in a first configuration while FIG. 4d shows an intermediate portion of the channels 12 and 14 in a second configuration. As is readily apparent the difference between the first and second configurations is that the spacing or distance between different sets of channels 12 and 14 has changed. Specifically the spacing/distance between respective sets of channels 12 and 14 has decreased from the first end portions to the intermediate portions. The decrease in spacing is also accompanied by an interleaving of the respective different channels.

In FIG. 4d channels 12, 14 are arranged in respective alternating rows having centrelines C1-C4. The channel 14ba has a shared heat transfer length X with channel 12aa, a shared heat transfer length X with channel 12ab, and a shared heat transfer length Y with channel 12ca. Using the same nomenclature total first shared heat transfer length between the channels 12 and 14 in FIG. 4d is 14X+4Y. The configuration of the channels 12, 14 in FIG. 4d facilitates convenient connection to respective headers (not shown) of the heat exchanger 10d.

In FIG. 4e the distance or spacing between the centrelines C1-C4 has reduced in comparison to that in FIG. 4d. The channel 14ba has a shared heat transfer length Z with channel 12aa, a shared heat transfer length Z with channel 12ab, and a shared heat transfer length Y with channel 12ca. Using the same nomenclature total second shared heat transfer length between the channels 12 and 14 in FIG. 4e is 14Z+4Y.

As Z>X it necessarily follows that the second shared heat transfer length 14Z+4Y is different to and specifically greater than 14X+4Y. In addition to this increased heat transfer length between the two different configurations the actual distance or thickness of material in the heat exchanger between the channels different of different sets 12, 14 has reduced. This also leads to an increase in the heat transfer coefficient due to a decrease in thermal inertia.

To summarise in the above described embodiments of the heat exchanger 10a, 10b 10c and 10d (hereafter referred to collectively and in general as "heat exchanger 10") the channels 12, 14 are reconfigured to change and in these examples increase the total shared heat exchange length between at least one of the transition zones T1 and T2 on the one hand and the heat transfer zone TZ on the other. In broad terms the reconfigurations may be described as follows:

For the heat exchanger 10a the reconfiguration is by way of rotating or twisting groups of channels in different sets C and H.

For the heat exchanger 10b the reconfiguration is by way of progressive relative linear translation or displacement of adjacent columns of channels 12, 14.

For the heat exchanger 10c the reconfiguration is by way of changing the cross sectional shape or profile of the channels 12, 14.

For the heat exchanger 10 the reconfiguration is by way of changing the spacing/distance between the channels 12, 14 which is also accompanied by a reduction in the wall thickness of material between the adjacent channels of different sets 12, 14.

Channel Ratios

A large number of alternative embodiments of the heat exchanger are also possible. The alternative embodiments may include having a different ratio of channels in the sets C and H. For example at present for each of the above described embodiments the ratio channels in the sets C and H is 1:1. However this need not be the case. For example the ratio may vary to be, but not limited to, 2:1 or 3:1 or any other ratio. The possibility of changing the ratio of channels between the respective different sets place for each and every embodiment described in the specification.

Figure 5B:
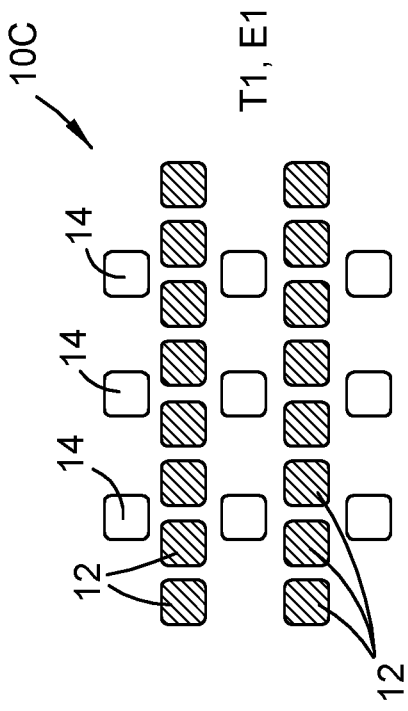
FIGS. 5a and 5b depict in various planes of a disclosed heat exchanger extending from an end portion of the channels in a transition zone (FIG. 5b) to an intermediate portion of the channels in a heat transfer zone (FIG. 5a) of an embodiment of the disclosed heat exchanger where a ratio of channels between the two sets is 3:1.
Figure 5A:
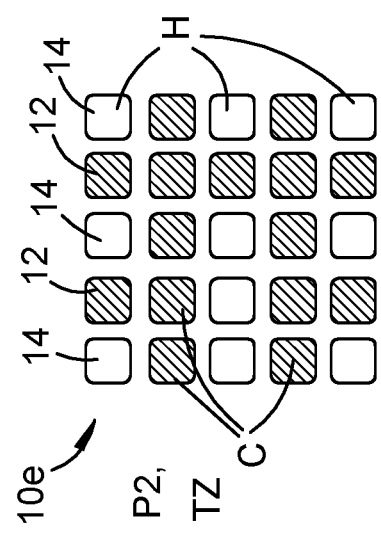

For example FIG. 5a shows a cross section through plane P2 in the heat transfer zone TZ of a heat exchanger 10e. FIG. 5b shows a cross-section through a plane P1 in the transition zone T1 the heat exchanger 10e This is a variation of the embodiment of the heat exchanger 10b (shown in FIG. 3) in which the number of channels 12 in the sets C is three times the number of channels 14 in the set H thereby providing a 3:1 ratio of channels in the different sets C and H.

Different Channel Shapes in Different Sets of Channels

In each of the above described embodiments of the heat exchanger 10 the channels 12, 14 in the different sets C and H respectively are shown as having the same cross sectional shape and cross-sectional area in successive transverse planes in the heat exchanger. However embodiments are not limited in this manner and it is possible for the channels in the sets C and H to have different cross sectional shape and/or cross-sectional area.

Figure 6C:
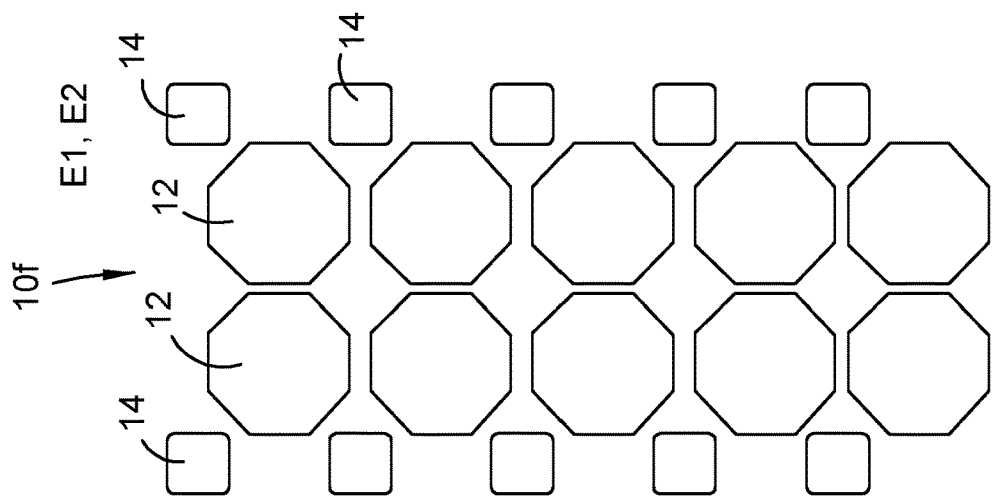
FIG. 6c depicts an alternate starting configuration of the different sets of channels for the embodiment of the heat exchanger shown in FIG. 6a, here the starting shape of the end portions of the channels in different sets is different to that in the intermediate portion shown in FIG. 6a and more particularly the shape of the channels in different sets in the end portions of the same as each other.
Figure 6B:
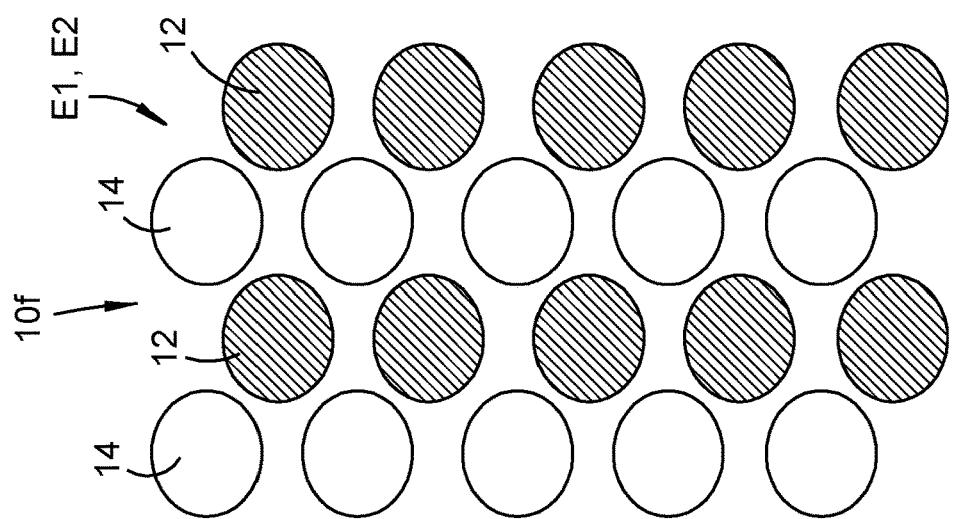
Figure 6A:
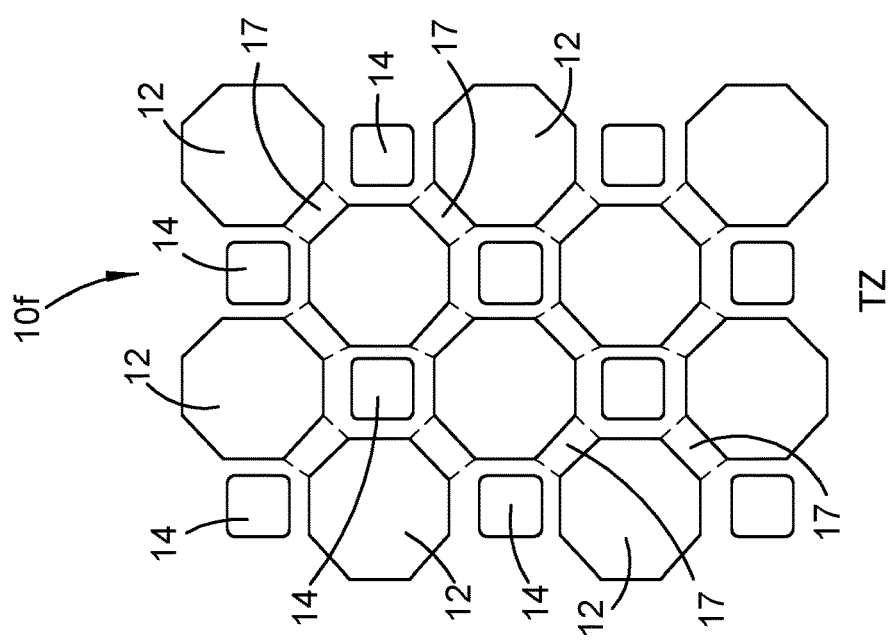
FIG. 6a depicts a plane in a heat transfer zone of a further embodiment of the disclosed heat exchanger where the channels in different sets have a different cross sectional shape or profile in the heat transfer zone, one set having a rounded quadrilateral profile with the other set having an octagonal profile.

For example FIGS. 6a and 6b illustrate intermediate and end portions respectively of different channels 12, 14 in a further embodiment of the disclosed heat exchanger 10f. In the heat exchanger 10f the fluid channels 12 of the have a cross-sectional area that is greater than that of the fluid channels 14 of in the primary heat transfer zone TZ. This is facilitated by the channels 12 and 14 having a different cross sectional shape and configuration in the heat transfer zone as shown in FIG. 6a. However at the end portions E1, E2 of these channels have the same shape and configuration, namely elliptical, as illustrated in FIG. 6b.

As with the previously described embodiments the channels 12 and 14 can be arranged in a first configuration similar to that shown in the embodiments of FIG. 1a, 2a, 3a or 4a to facilitate fluid coupling with manifolds MC and MH allowing fluid to flow into and out of the corresponding channels. Therefore in order for the channels 12, 14 to be reconfigured from the end portions E1, E2 to the intermediate portion, the channels 12, 14 will undergo a change in shape as well as a change in relative position.

The heat exchanger 10f is suited to applications in which the fluid in channels 14 is relatively clean and the fluid in channels 12 is comparatively dirty and hence the greater cross-sectional area for the fluid channels 12 allows the dirtier fluid to flow through the heat exchanger with less likelihood of clogging.

FIG. 6c shows an alternate configuration to that of FIG. 6b, for the end portions E1, E2 of the channels 12, 14. In this variation the shape of the channels 12, 14 at the end portions E1, E2 is a same as the shape of the channels in the heat transfer zone TZ. Accordingly in this variation of the heat exchanger 10f it is the relative position only of the channels 12, 14 changes from the end portions E1, E2 to the heat transfer zone TZ. This variation is somewhat akin to that described in relation to the heat exchanger 10d shown in FIGS. 4d and 4e.

Both variations of the heat exchanger 10f may be considered as representative of a more general embodiment of the heat exchanger in which the cross sectional shape of at least one of the sets of channels changes from the end portions which reside in the transition zones T1, T2 to the intermediate portion in the heat transfer zone TZ.

Optionally passages can be formed in the thickness of the material of the heat exchanger between channels in a particular set. Such passages most conveniently formed in the heat transfer zone TZ of a heat exchanger. FIG. 6a illustrates examples of the optional passages 17 formed between the channels 12. The channels 17 may assist in promoting equalised pressure and volumetric fluid flow through the channels 12. The existence of such passages 17 is not limited only to the configuration of channels 12, 14 in the heat exchanger shown in FIG. 6a. This may be applied to all of embodiments of disclosed in the specification.

Figure 7B:
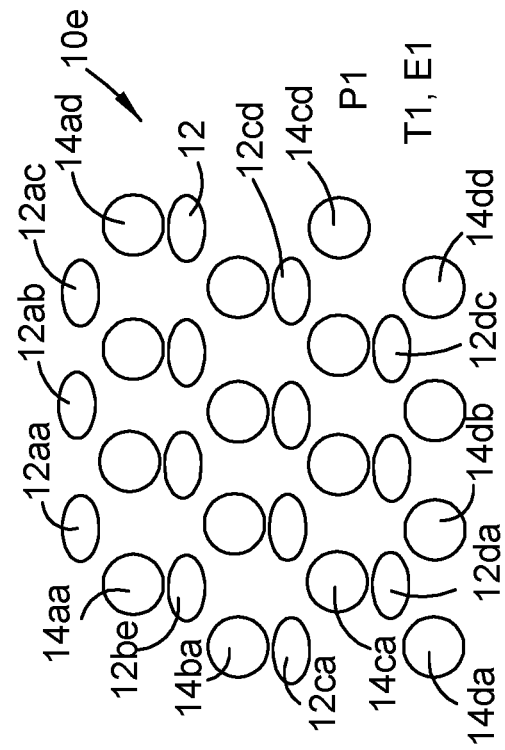
FIGS. 7a and 7b depict in various planes of a disclosed heat exchanger extending from an end portion of the channels in a transition zone (FIG. 7b) to an intermediate portion of the channels in a heat transfer zone (FIG. 7a) of an embodiment of the disclosed heat exchanger where the channels of different sets have a different cross sectional shape or profile in the heat transfer zone, one set having a circular profile with the other set having a profile made from a plurality of joined concave walls.
Figure 7A:
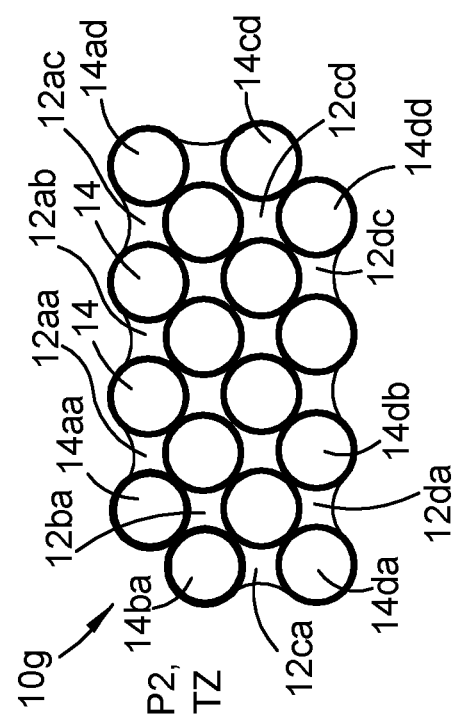

A further example of an embodiment of the heat exchanger 10g where the channels in the different sets C and H have different configuration is shown in FIGS. 7a and 7b. In this embodiment the channels 12 in the set C may carry a cold fluid while the channels 14 in the set H carry a hot fluid. The fluid channels 12 have convex walls while the fluid channels 14 have concave, and more particularly circular, walls.

This arrangement is suitable when the fluid in channels 12 is a high pressure fluid whilst the fluid in channels 14 is a low pressure fluid. The concave shape of the fluid channel walls helps to contain the high pressure fluid with a higher design temperature.

In the heat exchanger 10e, FIG. 7a illustrates the arrangement of channels 12, 14 in the primary heat transfer zone TZ in a plane P2. FIG. 7b illustrates the configuration of end portions E1 of the channels 12, 14 in the transition zone T1 through a plane P1 of the heat exchanger. From this can be seen that the reconfiguration of channels 12, 14 from the end portion E1 to the intermediate portion in the heat exchange zone TZ involves both a reconfiguration of the shape of channels 12 and a relative repositioning of the channels 12 and 14.

The use of concave walls, or other configurations of walls which do not have distinct or sharp corners may be useful where the fluid is "dirty" or contains suspended solid particles. This minimises the risk of accumulation of solids in the channels.

In other applications, the fluid channels can be arranged to have a cross-section which varies, e.g., widens to accept greater volumetric flows or narrows for slowing volumetric flow rates. In other applications, the wall thickness of one or both of the fluid channels 12 and 14 may be tapered gradually to provide optimal stiffness or improved stress distribution along the length of the fluid channels.

End to End Change in Channel Cross Sectional Shape

In the above described embodiments the heat exchangers 10 have transition zones T1 and T2 at opposite ends in which the configuration and/or cross sectional area of the end portions of the channels is the same. However this need not be the case. The configuration and/or cross sectional area of at least one of the sets of the channels at opposite ends may be different to each other.

Examples of heat exchangers were at least one of the sets of channels has a cross-sectional area that is different at opposite ends of the heat exchanger are shown in FIGS. 8a-10c. In these exchangers at least one of the sets of channels has a continuously varying cross-sectional area from one end to another. Channels having a progressively increasing or decreasing cross-sectional area from end to end find use in accommodating or indeed promoting a change in phase of the fluid flowing through the corresponding channel. This may occur for example were a liquid refrigerant vaporises as it flows through the heat exchanger. The change in cross-sectional area also provides the ability to control flow rate and pressure drop across the heat exchanger.

FIGS. 8a-8c show a channel 12 and a channel 14 for a heat exchanger 10h in which the cross-sectional area of each of the channels 12 and 14 progressively changes along the length of that channel. FIG. 8a show a front view of the end portions E1 of channels 12 and 14 at one end of a heat exchanger 10h with FIG. 8b showing the front view of end portions E2 of the channels 12 and 14 at a second opposite end of the heat exchanger 10h. The end portions E1 of the channels 12 and 14 are arranged in a first configuration 20ha, while the end portions E2 are arranged in a second different configuration 20hb. The difference in the configuration is manifested by a reduction in the cross-sectional area or perimeter length of the channels 12, 14 from end portions E1 to end portions E2. This is readily apparent from FIG. 8c which shows the longitudinal section view of the channels 12, 14 from end portion E1 to end portion E2.

In this embodiment both of the channels 12 and 14 have a decrease in cross-sectional area from end portion E1 to end portion E2. One application of this arrangement would be for example in the liquefaction of LNG. In such an application natural gas is provided as the feed stream to the end E1 of channel 14, while a liquid refrigerant is provided as a feed stream at the end portion E2 of the channel 12. By virtue of the heat exchange between the gas and the refrigerant the gas cools and condenses to form a liquid or at least a mixed phase of gas and liquid at the end portion E2 of channel 14. This coincides with an increase in the pressure of the fluid was in the channel 14 as it flows from the end portion E1 to the end portion E2.

In contrast the refrigerant entering at end E2 as a liquid is vaporised by virtue of the heat exchange with the gas the channel 14. The vaporisation is promoted or assisted by the increase in cross-sectional area of the channel 12 in a direction of flow from end portion E2 to end portion E1. The increase in cross-sectional area in this direction of flow of the refrigerant facilitates a decrease in fluid pressure.

It should also be recognised that in the arrangement shown in the heat exchanger 10h the total first shared heat transfer length of mutually opposed perimeters of the adjacent end portions E1 of the different channels 12, 14 is different to the total second shared heat transfer length of the opposed perimeters of the channels 12, 14 in a plane P2 which is made through an intermediate portion of the channels 12, 14.

A difference between the configuration of the channels 12, 14 of the heat exchanger 10h in terms of the variation in the total shared heat transfer length along different transverse planes in comparison to earlier embodiments for example shown in heat exchangers 10a-10g, is that this variation in the heat exchanger 10h is in substance for the entire length of the channels from end portion E1 to end portion E2. In contrast in the heat exchangers 10a-10i the variation in the total heat transfer length is at a maximum in the intermediate portion of the channels and a minimum at each of the opposite ends portions E1, E2.

FIGS. 9a-9c depict a heat exchanger 10i which is a variation of the heat exchanger 10h in that only one of the channels, in this instance channel 14, has a change in cross-sectional area from end portion E1 and E2 whereas the channel 12 has a constant cross-sectional area from end to end. The embodiment of the heat exchanger 10i application similar to that of the exchanger 10h, but where only one of the fluids undergoes a phase change. The fluid which is expected to undergo phase change during the transfer in the heat exchanger flow through the channel with varying cross-sectional area, in this case being channel 14.

One example of an application for this type of heat exchanger would be in a propane cooling circuit. Here propane vapour is provided as a feed stream to the end portion E1 of the channel 14, with cold water being provided as the feed stream at the end portion E2 of the channel 12. As a result of the heat transfer between the propane and the water the propane may partially or fully condense to a liquid phase at the relatively small diameter end portion E2 of the channel 14. While the water flowing through channel 12 has an increase in temperature this is not sufficient to cause it to vaporize. Thus the water maintains its liquid phase flowing from the end portion E2 to the end portion E1 and therefore there is no need to vary the cross-sectional area of the channel 12 to facilitate a change in phase.

In a similar manner to that described above in relation to the heat exchanger 10h there is also clearly a changing the total heat transfer length between the channels 12, 14 from one of the end portions E1, E2 to an intermediate portion, for example in plane P2, of the channels 12, 14.

FIGS. 10a-10c show further possible arrangement for a heat exchanger 10j in which the channels 12, 14 of both sets of channels vary in cross sectional area or length from one end portion E1 to the opposite end portion E2. In the heat exchanger 10j the variation in cross-sectional area of the channels 12, 14 is complimentary from end portion E1 to end portion E2. That is, the cross-sectional area of channel 12 increases from end portion E1 to end portion E2 whereas the cross-sectional area of channel 14 decreases from an end portion E1 to end portion E2.

The heat exchanger 10j may find application again in situations where the fluid passing through the heat exchanger changes phase. The difference with respect to the heat exchanger 10h being that the fluid flow in the channels of the heat exchanger 10j is concurrent rather than counter current. Thus for example a natural gas feed stream may be provided as the input at end portion E1 of channel 14, while a phase changing refrigerant feed stream is provided as the input at an end portion E1 of the channel 12. Thus the flow of the natural gas and the refrigerant is in the same direction from one end of the heat exchanger to the other.

Figure 11:
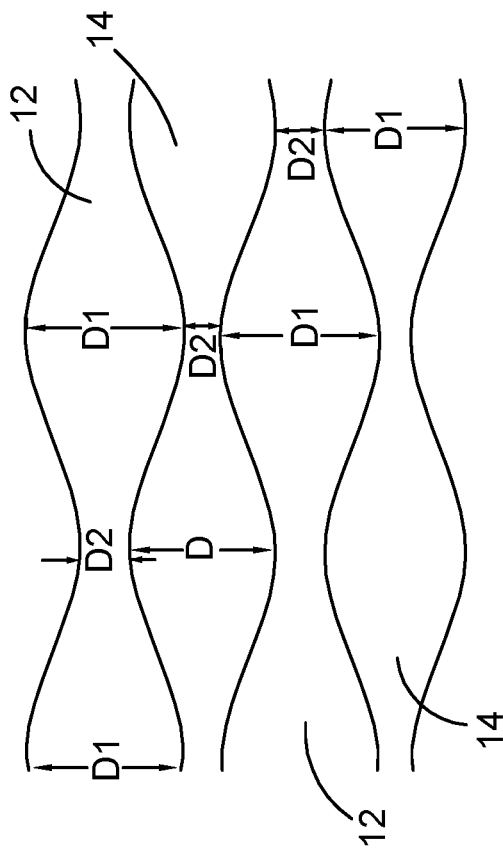
FIG. 11 depicts in cross-section a fluid flow channel that may be incorporated in an eighth embodiment of the disclosed heat exchanger in which the cross-sectional area of the channel cyclically varies along a portion of a length of the channel.

Another way of changing the cross sectional shape along the length of a channel is shown in FIG. 11, were a channel 12 or 14 (or of course both) may be formed so that its internal diameter cyclically varies along its length. If we assume that the channels 12, 14 are of a circular cross-section then the diameter D cyclically varies from maximum D1 to a minimum D2. This assists to break up the boundary layer effect of fluid flowing through the channels.

It should be noted that in these embodiments the relative juxtaposition of the channels 12, 14 does not change, or at least does not need to change, along the length of the heat exchanger as in the embodiments of the heat exchanger 10a, 10b and 10c. This may be seen as representing a different aspect of the disclosed heat exchanger which is independent of the need or desire to vary the total shared heat transfer length.

Shell and Tube Heat Exchanger

Referring back to the embodiment of the heat exchanger 10a shown in FIG. 1a the regions shown between the channels 12 and 14 may be completely filled with material so that the heat exchanger 10a is in effect a solid block of material. The solid material between the channels 12 and 14 may be seen as constituting shared walls of adjacent channels.

In an alternative embodiment however a plurality of fins or ribs may be provided to support the individual channels 12 and 14. The ribs or fins may together provide a further fluid flow path through which a third fluid may flow. This may be considered as a "shell flow path" for carrying a "shell fluid" which is passed into and out of the shell constituted by an outer peripheral wall of the heat exchanger 10a.

Figure 12:
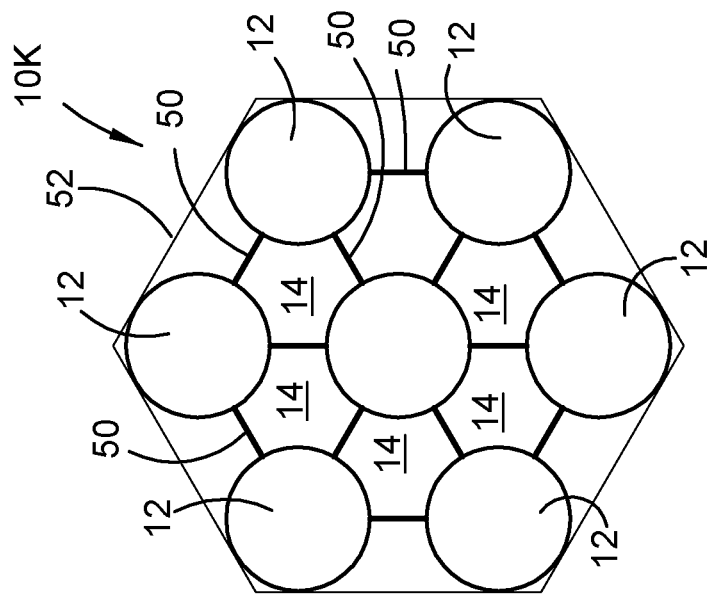
FIG. 12 depicts in cross-section flow channels of a further embodiment of the disclosed heat exchanger taking a form of a shell and tube heat exchanger.

FIG. 12 shows a cross-section through a further embodiment of the heat exchanger 10k which comprises a plurality of channels 12 of circular cross-section from end to end joined together by a plurality of ribs or fins 50. The ribs/fins 50 are arranged in a pattern so as to define or form channels 14 between a group of fins and corresponding connected channels 12. By providing an outer wall or shell 52 about the channels 12 and 14 a shell and tube heat exchange has now been formed. Providing the shell 52 also results in the creation of additional channels 14a formed between the outer wall/shell 52 and the outer peripheral channels 12. Holes or slots may be formed in the ribs/fins 50 to facilitate flow of fluid between the channels 14 and 14a.

It should be noted that in the embodiment of the heat exchanger 10k shown in FIG. 12 the relative juxtaposition of the channels 12, 14 does not change, or at least does not need to change, along the length of the heat exchanger as in the embodiments of the heat exchanger 10a, 10b and 10c. This may be seen as representing a different aspect of the disclosed heat exchanger which is independent of the need or desire to vary the shared heat transfer length.

Surface Finishing

The interior surface of the channels 12, 14 in the respective sets of channels C and H for each and every one of the embodiments of the heat exchangers 10a-10k described above may be provided with various surface finishes to achieve different effects and in particular enhance or improve the efficiency of heat exchange between fluids in the different channels.

For example interior surface of the channels 12, 14 may be as smooth. However in alternative embodiments the surface finish may be specifically designed to promote turbulence or otherwise interrupt or reduce the boundary effect of fluids flowing within the channels. Examples of this include providing the interior surface of either one or both of the channels 12, 14 with:
- a prescribed surface roughness
- raised dimples
- grooves for example, but not limited to, spiral grooves similar to rifling in a barrel of a firearm
- fins extending radially inward from the channel surfaces along the channels; the fins may be arranged in a spiral path similar to rifling, or may follow a wavelike path in a direction perpendicular to the radius, or indeed the fins may be provided with dimples or a prescribed roughness on their surface.

It should be noted that the provision of these types of surface finishes is independent of the relative juxtaposition of the channels 12, 14. That is, such surface finishes may be provided whether or not the juxtaposition of channels 12, 14 changes between any two points along the flow path in the heat exchanger.

This may be seen as representing a different aspect of the disclosed heat exchanger which is independent of the need or desire to vary the total shared heat transfer length. In broad terms in this aspect there is disclosed a heat exchanger comprising at least one fluid channel through which a fluid can flow the at least one fluid channel having an internal surface arranged to induce turbulence or interrupt or otherwise reduce the boundary effect of fluids flowing through the at least one fluid channel.

To achieve this effect the internal surface of the at least one channel may be one, or a combination of any two or more, of: (a) roughened; (b) provided with one or more grooves; (c) provided with one or more protruding ridges or rib; (d) provided with raised dimples; and (e) provided with one or more fins; to induce turbulence in a fluid when flowing through the at least one first channel.

As will be described in greater detail later these embodiments may be realised by use of an additive layer manufacturing process.

Spiral/Helical Channel Paths

In further embodiments of the disclosed heat exchanger 10 the channels 12, 14 may be configured to follow a path that varies in three-dimensional space such as a helical path as shown in FIG. 13. In this example the channels 12, 14 have a constant cross-sectional shape and configuration but follow a helical or spiral path along the length of the heat exchanger. It is believed that such a path may be preferable over zigzag or serpentine paths in a common plane as such configurations are susceptible to the formation of dead zones at inflection points.

Change of Heat Transfer Characteristics in Terms of Surface Area

In many of the above described embodiments the change of heat transfer characteristics of the heat exchangers is described in terms of changes in or variation of the shared heat transfer length between heat exchangers in different sets of heat exchangers. However this may also be described in terms of a change or variation in the wall surface area of the heat exchanger in a heat exchange path between channels in different sets of channels in planes perpendicular to the flow path. This is described for example with reference to FIGS. 14a and 14b. These Figures show a distribution of first and second channels in the heat exchanger identical to FIGS. 2a and 2d respectively. In describing the heat exchanger in relation to FIGS. 2a and 2d reference was made to the shared heat transfer length X and Y. This may be equivalently described in relation to the total surface area of material of the heat exchanger lying in a heat exchange path between channels of the first and second sets.

FIG. 14a shows distribution of first channels 12 second channels 14 in the plane P1 of the heat exchanger 10a shown in FIG. 1a. The arrows T show heat transfer paths from fluid flowing through the hot channels 14 to the cold channels 12. The heat is transferred through the solid material of the heat exchanger between the channels 12 and 14. The summation of the shaded areas 60 through which heat flows from the channels 14 to the channels 12 it constitutes the total surface area of material in the heat exchanger lying in the heat exchange path between the first and second sets of channels 12, 14 in the plane P1 which is a plane of the heat exchanger perpendicular to the first flow path constituted by the channels 12. This is independent of whether fluid is flowing into or out of the channels 12. It should be understood the plane P1 is of course also perpendicular to a second flow path constituted by the channels 14.

FIG. 14b shows the distribution of first channels 12 and second channels 14 in the plane P2 of the heat exchanger 10a. Here the channels 12 and 14 are rearranged so that there is a substantial increase surface area of material of the heat exchanger in the heat transfer paths T exist for transferring heat from the fluid in the channels 14 to the fluid in channels 12. The surface area is substantially the full surface area 62 (which is represented by the hashing in FIG. 14b) in the plane P2 of the heat exchanger 10a minus the area of the channels 12, 14 themselves and perhaps some small intermediate regions 64 where heat transfer may be minimal.

From a comparison between FIGS. 14a and 14b it becomes immediately apparent that in this and other embodiments of the disclosed heat exchanger the rearrangement or reorientation of the heat exchanger paths 12, 14 in the different sets C, H respectively enables a variation in the surface area of the material through each heat is transferred in two spaced apart planes of the heat exchanger perpendicular to the flow of fluid through the channels 12, 14.

Joint and Several Nature of Embodiments

Now that numerous embodiments of the heat exchanger 10 have been described above it should be understood that various embodiments of the heat exchanger 10 may stand alone as separate embodiments or aspects of the disclosed heat exchanger; or can be combined in various combinations to form other embodiments or aspects of the heat exchanger. For example:

The embodiment of the heat exchanger 10a shown in FIGS. 1a-2d may stand alone or may be further modified or varied by of incorporating one of the surface finishes described above, or have an alternate ratio of channels 12 to channels 14 such as the embodiment 10d, or be formed with channels 12, 14 in the heat transfer zone TZ of different configuration as in the embodiment 10e, or have the channels 12, 14 arranged so is to vary in cross sectional shape along the length of the channels such as shown in FIG. 11;

Embodiments of the heat exchanger 10a-10k in addition to the possible variations noted immediately above may also be formed with more than two sets of heat exchanger channels H, C. For example embodiments of the heat exchanger may be arranged to enable the flow of three for more fluids, in a manner to facilitate heat exchange between fluids.

Embodiments of the heat exchanger 10a-10k are described and illustrated as being provided with sets of channels H, C which terminated in headers at opposite ends of the heat exchanger. However embodiments of the disclosed heat exchanger to be provided with sets of channels H, C which follow in broad terms a U-shaped configuration so that all of the headers are at one end of the heat exchanger.

Method of Construction

Many of the above described embodiments of the disclosed heat exchanger could be constructed or manufactured using conventional manufacturing techniques. However it is believed that at least some of the embodiments would be very challenging in an engineering sense and/or otherwise extremely expensive and moreover not commercially feasible to manufacture using conventional manufacturing techniques. Nonetheless, it is believed that using additive manufacturing techniques, or other recently developed manufacturing techniques, heat exchangers in accordance with the present disclosure can be manufactured at a significantly reduced cost as compared to traditional manufacturing techniques. At least a portion of one or more of the embodiments of the disclosed heat exchange system may be formed using a rapid prototyping or additive layer manufacturing process. In other embodiments, the entire heat exchange system is formed using a rapid prototyping or additive layer manufacturing process. In general, additive manufacturing techniques provide flexibility in free-form fabrication without geometric constraints, fast material processing time, and innovative joining techniques.

Some examples of additive layer manufacturing processes include, but are not limited to: micro-pen deposition in which liquid media is dispensed with precision at the pen tip and then cured; selective laser sintering in which a laser is used to sinter a powder media in precisely controlled locations; laser wire deposition in which a wire feedstock is melted by a laser and then deposited and solidified in precise locations to build the product; electron beam melting; laser engineered net shaping; and direct metal deposition. Other additive manufacturing techniques include, for example, direct metal laser sintering or direct metal laser fusion with, for example, nickel base super-alloys, low density titanium, or aluminium alloys. Another technique includes electron beam melting with titanium, titanium aluminide, and nickel base super-alloy materials. Still further, casting or metal injection moulding (MIM) may be employed.

Various components of the heat exchanger, whether made by additive manufacturing techniques or otherwise, may be brazed or otherwise joined together to form a completed heat exchange system. By way of example, the illustrated embodiment of the heat exchanger can be manufactured by a three dimensional printing process such as that outlined in detail in U.S. Pat. No. 6,623,687 (issued to Gervasi dated 23 Sep. 2003), the contents of which are hereby incorporated in their entirety by way of reference. When three dimensional printing has been completed, the heat exchanger that is removed from the additive manufacturing system may undergo finishing treatments. Finishing treatments may include, for example, aging, annealing, quenching, peening, polishing, hot isostatic pressing (HIP), or coatings. If necessary, the heat exchanger may be machined to final specifications.

Additive manufacture may be used to form a single heat exchanger or to form a plurality of heat exchangers simultaneously. Simultaneous fabrication of a number of components may reduce cost and variability of the manufacturing process. Preferably the material from which the heat exchanger is printed is, or includes, a metallic material. Other embodiments of the disclosed heat exchanger may be manufactured using alternative methods, such as the individual machining of various layers, for example. In accordance with this method, each individually machined layer defines at least some portions of the flow paths. Once machined, the individual layers are bonded together by an adhesive, welding, or other such means.

It has been appreciated by the inventor of the current application that the use of the three dimensional printing manufacturing method provides significant freedom to design and manufacture a heat exchanger having a relatively complex arrangement of fluid channels. Durability and life span of the heat exchanger of embodiments of the disclosed heat exchanger may be improved by manufacturing each portion of the heat exchange system using designs that minimize the structural stresses that will be encountered during operation, and by improving the physical connection between the various components.

It expected that the disclosed heat exchangers will be suitable for use in a wide array of applications. Some non-limiting examples include auxiliary power units, environmental control systems, chemical reaction systems, and any other systems where heat exchange between two fluid media (gas, liquid, etc.) is either required or desirable.

The specific geometry of the first and second fluid channels in terms of cross-sectional area, spacing and groupings may be determined by computational fluid/heat transfer analysis and by corresponding stress analysis to optimize the overall performance of the heat exchanger with respect to pressure drops, heat transfer, stress, and weight.

When using the additive manufacturing techniques for construction of the disclosed heat exchangers the entire heat exchanger including the headers can be made in a continuous process. Alternately a main body of the heat exchanger and the headers may each be made using the additive manufacturing technique but form separately and subsequently joined together. For example with reference to FIG. 1a the main body of the heat exchanger between ends 18 and 26 may be made separately from the headers represented in FIG. 1b. The headers may then be subsequently attached to the main body.

While several exemplary embodiments have been presented in the foregoing detailed description, it should be appreciated that a vast number of variations exist. It should also be appreciated that the exemplary embodiments of the heat exchange are only examples, and are not intended to limit the scope, applicability, or configuration of the present disclosure in any way. Rather, the foregoing detailed description will provide those skilled in the art with a convenient road map for implementing an exemplary embodiment of the disclosed heat exchanger.

In the preceding description and claims which follow, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the disclosed heat exchanger.

What is claimed:

1. A heat exchanger comprising:
   at least a first set of fluid channels and a second set of fluid channels, each fluid channel of the first and second sets of fluid channels having a first end portion, a second end portion, and an intermediate portion between the first and second end portions;
   the first end portions and the second end portions being arranged in alternating planes of channels so that each plane contains only fluid channels from the same set of fluid channels; and
   a first transition zone, a second transition zone and a heat transfer zone between the first and second transition zones;
   wherein:
      the first end portions extend through the first transition zone, the second end portions extend through the second transition zone, and the intermediate portions extend through the heat transfer zone;
      the first transition zone includes one or more groups of fluid channels, wherein each group of fluid channels comprises:
         at least one fluid channel of the first set and at least one fluid channel of the second set;
         less fluid channels of the first set than a number of fluid channels in any one of the planes of fluid channels of the first set; and
         less fluid channels of the second set than a number of fluid channels in any one of the planes of fluid channels of the second set; and
      the one or more groups of fluid channels are rotated about respective axes parallel to a direction of flow of fluid through the fluid channels through 180° relative to other non-rotated fluid channels so that, when the channels reach and extend through the heat transfer zone, the fluid channels of the first and second sets are arranged in a chequer board configuration formed of rotated and non-rotated fluid channels.

2. The heat exchanger of claim 1, wherein each group of fluid channels comprises a single fluid channel from the first set of fluid channels and a single fluid channel from the second set of fluid channels.

3. The heat exchanger of claim 1, wherein each fluid channel defines a fluid flow path through the heat exchanger extending from the first end portion to the second end portion and wherein the transition zone extends for at least one quarter of the length of the fluid flow path through the heat exchanger.

4. The heat exchanger of claim 1, wherein each fluid channel has a constant cross-sectional shape from the first end portion to the second end portion, wherein the cross-sectional shape is viewed perpendicular to the direction of flow of fluid through the heat exchanger.

5. The heat exchanger of claim 4, wherein the cross-sectional shape is selected from the group consisting of a circle, an ellipse, and a rounded polygon with four or more sides.

6. The heat exchanger of claim 1, wherein an internal surface of the at least one fluid channel in at least one of the sets of fluid channels is arranged to induce turbulence in fluid when flowing through the at least one fluid channel.

7. The heat exchanger of claim 6, wherein the internal surface of the at least one fluid channel is one, or a combination of any two or more, of: (a) roughened, (b) provided with one or more grooves, (c) provided with one or more protruding ridges or ribs, (d) provided with raised dimples, and (e) provided with one or more fins, to induce turbulence in a fluid when flowing through the at least one channel.

8. A heat exchanger comprising:
   at least a first set of fluid channels and a second set of fluid channels, each fluid channel of the first set of fluid channels and second set of fluid channels having a first end portion, a second end portion, and an intermediate portion between the first and second end portions;
   the first end portions and the second end portions being arranged in alternating planes of fluid channels so that each plane contains only fluid channels from the same set of fluid channels;
   a first transition zone, a second transition zone and a heat transfer zone between the first and second transition zones;
   wherein:
      the first end portions extend through the first transition zone, the second end portions extend through the second transition zone, and the intermediate portions extend through the heat transfer zone; and
      the first transition zone includes a plurality of fluid channels provided within corresponding rotating groups that rotate the fluid channels within each rotating group between the first transition zone and the heat transfer zone, wherein, in the first transition zone:
         a first rotating group of fluid channels comprises one fluid channel of the first set of fluid channels and one fluid channel of the second set of fluid channels;
         a second rotating group of fluid channels comprises one fluid channel of the first set of fluid channels and one fluid channel of the second set of fluid channels, the second rotating group of fluid channels being adjacent to the first rotating group of fluid channels;
         at least one of the first rotating group of fluid channels and the second rotating group of fluid channels rotates about a respective axis that is parallel to a direction of flow of fluid through the fluid channels; and
         each fluid channel that rotates between the first transition zone and the heat transfer zone is provided within a single rotating group such that, when the first set of fluid channels and the second set of fluid channels reach and extend through the heat transfer zone, the first set of fluid channels and the second set of fluid channels are arranged in a chequer board configuration.

9. The heat exchanger of claim 8, wherein each fluid channel defines a fluid flow path through the heat exchanger extending from the first end portion to the second end portion and wherein the transition zone extends for at least one quarter of the length of the fluid flow path through the heat exchanger.

10. The heat exchanger of claim 8, wherein each fluid channel has a constant cross-sectional shape from the first end portion to the second end portion, wherein the cross-sectional shape is viewed perpendicular to the direction of flow of fluid through the heat exchanger.

11. The heat exchanger of claim 10, wherein the cross-sectional shape is selected from the group consisting of a circle, an ellipse, and a rounded polygon with four or more sides.

12. The heat exchanger of claim 8, wherein an internal surface of the at least one fluid channel in at least one of the sets of fluid channels is arranged to induce turbulence in fluid when flowing through the at least one fluid channel.

13. The heat exchanger of claim 12, wherein the internal surface of the at least one fluid channel is one, or a combination of any two or more, of: (a) roughened, (b) provided with one or more grooves, (c) provided with one or more protruding ridges or ribs, (d) provided with raised dimples, and (e) provided with one or more fins, to induce turbulence in a fluid when flowing through the at least one fluid channel.

* * * * *